(12) United States Patent
Crosby et al.

(10) Patent No.: US 12,399,874 B1
(45) Date of Patent: Aug. 26, 2025

(54) DE-CONFLICTION SYSTEM AND METHOD OF QUERYING A DATABASE INCLUDING CONFUSABLE CHARACTERS

(71) Applicant: The Government of the United States as represented by the Director, National Security Agency, Ft. George G. Meade, MD (US)

(72) Inventors: Marc E. Crosby, Arnold, MD (US); Shaun T. Eames, Woodbine, MD (US)

(73) Assignee: The Government of the United States, as represented by the Director, National Security Agency, Ft. George G. Meade, MD (US)

( * ) Notice: Subject to any disclaimer, the term of this patent is extended or adjusted under 35 U.S.C. 154(b) by 0 days.

(21) Appl. No.: 18/374,276

(22) Filed: Sep. 28, 2023

(51) Int. Cl.
*G06F 16/215* (2019.01)
*G06F 16/242* (2019.01)

(52) U.S. Cl.
CPC ........ *G06F 16/215* (2019.01); *G06F 16/2433* (2019.01)

(58) Field of Classification Search
None
See application file for complete search history.

(56) References Cited

U.S. PATENT DOCUMENTS

| | | | | |
|---|---|---|---|---|
| 9,135,539 B1* | 9/2015 | Nemeth | ............... | G06K 15/181 |
| 9,477,784 B1* | 10/2016 | Bhave | .................. | G06F 16/258 |
| 10,169,414 B2* | 1/2019 | Brodsky | ............. | G06F 16/2456 |
| 11,010,414 B2* | 5/2021 | Bhave | .................. | G06F 16/2455 |
| 11,451,842 B2* | 9/2022 | Gershey | .................. | G06N 20/00 |
| 12,015,812 B2* | 6/2024 | Gershey | ............. | H04N 21/2187 |
| 12,299,135 B2* | 5/2025 | Griffin | .................. | G06F 21/577 |
| 2005/0240393 A1* | 10/2005 | Glosson | ................ | G06F 40/166 704/8 |
| 2017/0308576 A1* | 10/2017 | Brodsky | ............. | G06F 16/2455 |
| 2019/0095489 A1* | 3/2019 | Brodsky | ............... | G06F 40/129 |
| 2020/0364255 A1* | 11/2020 | Bhave | ................. | H04L 12/4625 |
| 2022/0058658 A1* | 2/2022 | Herrera | ................. | G06F 16/215 |
| 2022/0171769 A1* | 6/2022 | Shin | .................... | G06F 16/2425 |
| 2022/0174342 A1* | 6/2022 | Gershey | ............ | H04N 21/26291 |
| 2022/0398542 A1* | 12/2022 | Livingstone | .......... | G06F 16/685 |

(Continued)

OTHER PUBLICATIONS

Extremely Fast Text Feature Extraction for Classification and Indexing (Year: 2008).*

(Continued)

*Primary Examiner* — Kim T Nguyen

(57) ABSTRACT

A de-confliction system and a method of querying a database of records utilizing the de-confliction system is provided. A universal script is created from language-agnostic de-confliction scripts. Each de-confliction script addresses a set of confusable characters and multiple de-confliction scripts may be combined to provide a Universal script. Application of the universal script to the original content output of the database provides for the replacement of confusable characters with functional characters and the creation of a functional output. The functional output is used to create a functional index which is provided in the database record. Application of the Universal script to a query provides a functional query. Running of the functional query on the indexes of the database provides improved search results for databases including confusable characters.

20 Claims, 26 Drawing Sheets

2
↘ كتاب  06A9, 062A, 0627 and 0628

↗ كتاب  0643, 062A, 0627 and 0628
/
4

(56) References Cited

U.S. PATENT DOCUMENTS

| | | | |
|---|---|---|---|
| 2023/0007325 A1* | 1/2023 | Gershey | H04N 21/26291 |
| 2023/0169075 A1* | 6/2023 | Han | G06F 16/243 |
| | | | 707/769 |
| 2025/0036854 A1* | 1/2025 | Kandari | G06F 40/109 |
| 2025/0078488 A1* | 3/2025 | Kuznetsov | G06V 30/133 |

OTHER PUBLICATIONS

Basis Technology Corp., Rosette Base Linguistics, Java Edition (RBL-JE), Application Developer's Guide, Version 7.20.1.c58.3, Apr. 2017, pp. 1-106, Basis Technology Corp, Cambridge, MA, USA.

Hazm -Persian NLP Toolkit ReadME.md; pp. 1-6;retrieved on Oct. 25, 2023], Retrieved from internet: <https://github.com/roshan-research/hazm#readme>.

Apache Lucene 9.8.0 Documentation [online]. Apache Lucene [retrieved on Nov. 14, 2023]. Retrieved from internet: <URL:https://lucene.apache.org/core/9_8_0/index.html>.

Apache Lucene—Query Parser Syntax [online]. The Apache Software Foundation, 2006 Apache Lucene [retrieved on Nov. 14, 2023]. Retrieved from internet :<URL:https://lucene.apache.org/core/2_9_4/queryparsersyntax.html>.

Ingersol et. al., Taming Text: How to Find, Organize and Manipulate It, 1st edition: Manning Publication, 2013, Chapter 4. Fuzzy String Matching, pp. 1-41, ISBN-13:978-1-933988-32-2.

* cited by examiner

2 → كتاب   06A9, 062A, 0627 and 0628

→ كتاب   0643, 062A, 0627 and 0628
4

FIG. 1A

6 → ي   064A   Arabic Yeh

→ ى   06CC   Farsi Yeh
8

FIG. 1B

| Language-Depdendent Expanded Unicode Groups ||||| 
|---|---|---|---|---|
| Arabic Script Character | Character Description | Unicode Code | Language | Expanded Unicode Group |
| ك | KAF | \U0643 | A,D,F,M,P,S,U | 1 |
| ک | KAF | \U06A9 | A,D,F,M,P,S,U | 1 |
| ڬ | KAF | \U06AC | A,D,F,M,P,S,U | 1 |
| ګ | KAF | \U06AB | A,M,S | 1 |
| گ | KAF | \U06AF | A,M,S | 1 |
| ګ | GAF | \U06AB | D,F,P,U | 2 |
| گ | GAF | \U06AF | D,F,P,U | 2 |
| ى | ALEF MAKSURA | \U0649 | A,D,F,K,P,S,U | 3 |
| ي | YEH | \U064A | A,D,F,K,P,S,U | 3 |
| ی | YEH | \U06CC | A,D,F,K,P,S,U | 3 |
| ێ | YEH | \U06CE | A,D,F,K,P,S,U | 3 |
| ة | HEH | \U0629 | A,K,S,U | 4 |
| ه | HEH | \U0647 | A,K,S,U | 4 |
| ھ | HEH | \U06BE | A,K,S,U | 4 |
| ه | HEH | \U06C1 | A,K,S,U | 4 |

FIG. 2 (Prior Art)

| Unique AS Charac. | Descrpt. | Unicode | Unicode Consortium assigned Language |
|---|---|---|---|
| ح | Hah | 062D | Arabic |
| څ | Hah With Three Dots Above | 0685 | Pashto |
| ځ | Hah With Hamza Above | 0681 | Pashto |
| ړ | Reh With Ring | 0693 | Pashto |
| ش | Sheen | 0634 | Pashto |
| ښ | Seen With Dot Below And Dot Above | 069A | Pashto |
| ۆ | Oe | 06C6 | Uighur |
| ێ | Yeh With Small V | 06CE | Kurdish |
| ە | Ae | 06D5 | Uighur |

FIG. 4A

| Unique AS Charac. | Descrpt. | Unicode | Unicode Consortium Assigned Language |
|---|---|---|---|
| ء | Hamza | 0621 | Arabic |
| س | Seen | 0633 | Arabic |
| ق | Qaf | 0642 | Urdu |
| ز | Zain | 0632 | Arabic |
| ژ | Jeh | 0698 | Farsi |
| ج | Jeem | 062C | Arabic |
| چ | Tcheh | 0686 | Farsi |
| پ | Peh | 067E | Farsi |
| ب | Beh | 0628 | Arabic |
| ذ | Thal | 0630 | Arabic |
| ږ | (Deprecated) Reh w/ Dot Below & Dot Above | 0696 | Urdu |
| ص | Sad | 0635 | Arabic |

FIG. 4B

| Unique AS Charac. | Descrpt. | Unicode | Unicode Consortium Assigned Language |
|---|---|---|---|
| ض | Dad | 0636 | Arabic |
| ط | Tah | 0637 | Arabic |
| ظ | Zah | 0638 | Arabic |
| م | Meem | 0645 | Arabic |
| ݀ | Beheh | 0680 | Sindhi |
| ڃ | Nyeh | 0683 | Sindhi |
| ڄ | Dyeh | 0684 | Sindhi |
| ڇ | Tcheheh | 0687 | Sindhi |
| ڔ | Reh w/ Dot Below | 0694 | Kurdish |
| ڗ | Reh w/ 2 Dots Above | 0697 | Dargwa |
| ڙ | Reh With Four Dots Above | 0699 | Sindhi |
| ؎ | Arabic Poetic Verse Sign | 060E | Poetic |
| خ | Khah | 062E | Arabic |
| غ | Ghain | 063A | Arabic |

FIG. 4C

| Unique AS Charac. | Descrpt. | Unicode | Unicode Consortium Assigned Language |
|---|---|---|---|
| ٺ | Tteheh | 067A | Sindhi |
| ٻ | Beeh | 067B | Sindhi |
| ٿ | Teheh | 067F | Sindhi |
| ڊ | Dal w/ Dot Below | 068A | Sindhi |
| ڋ | Dal w/ Dot Below And Small Tah | 068B | Lahnda |
| ڌ | Dahal | 068C | Sindhi |
| ڍ | Ddahal | 068D | Sindhi |
| ڎ | Dul | 068E | Burushaski |
| ڏ | Dal w/ 3 Dots Above Downwards | 068F | Sindhi |
| ڜ | Seen w/ 3 Dots Below And 3 Dots Above | 069C | Moroccan |
| ڝ | Sad w/ 2 Dots Below | 069D | Turkik |
| ڞ | Sad w/ 3 Dots Above | 069E | Berber |
| ڠ | Ain w/ 3 Dots Above | 06A0 | Malay |

FIG. 4D

| Unique AS Charac. | Descrpt. | Unicode | Unicode Consortium Assigned Language |
|---|---|---|---|
| ڡ | Dotless Feh | 06A1 | Adighe |
| ڢ | Feh w/ Dot Moved Below | 06A2 | Maghrib |
| ڣ | Feh w/ Dot Below | 06A3 | Ingush |
| ڥ | Feh w/ 3 Dots Below | 06A5 | North African |
| ڦ | Peheh | 06A6 | Sindhi |
| ڧ | Qaf w/ Dot Above | 06A7 | Maghrib |
| ڨ | Qaf w/ 3 Dots Above | 06A8 | Tunisian |
| ڽ | Noon w/ 3 Dots Above | 06BD | Malay |
| ۽ | Sign Sindhi Ampersand | 06FD | Sindhi |
| ۾ | Sign Sindhi Postposition Men | 06FE | Sindhi |

FIG. 4E

| Deprecated Arabic Script Character | Description | Unicode | Unicode Consortium Assigned Language |
|---|---|---|---|
| ب | (Deprecated - Archaic) Dotless Beh | 066E | NA |
| ڡ | (Deprecated - Archaic) Dotless Qaf | 066F | NA |
| څ | (Deprecated) Hah With Two Dots Vertical Above | 0682 | Pashto |
| ڛ | (Deprecated) Seen With Three Dots Below | 069B | Farsi |
| ڟ | (Deprecated) Tah With Three Dots Above | 069F | Hausa |
| ڿ | (Deprecated) Tcheh With Dot Above | 06BF | NA |
| ڮ | (Deprecated) Dal With Inverted V | 06EE | Parkari |
| گ | (Deprecated) Reh With Inverted V | 06EF | Parkari |
| ښ | (Deprecated - Ext Arabic) Sheen With Dot Below | 06FA | NA |
| ڞ | (Deprecated - Ext Arabic) Dad With Dot Below | 06FB | NA |
| ڠ | (Deprecated - Ext Arabic) Ghain With Dot Below | 06FC | NA |

FIG. 5

| Confusable AS Char. | Confusable AS Char. Descript. | Unicode | Unicode Consortium Assigned Language | Funct. Code | Funct. Character | Funct. Group # | Funct. Description |
|---|---|---|---|---|---|---|---|
| ڤ | Veh | 06A4 | Kurdish | 0641 | ف | 1 | Feh |
| ى | Alef Maksura | 0649 | Arabic | 064A | ي | 2 | Yeh |
| ې | E | 06D0 | Pashto | 064A | ي | 2 | Yeh |
| ی | Farsi Yeh | 06CC | Farsi | 064A | ي | 2 | Yeh |
| ؽ | Yeh w/ Tail | 06CD | Sindhi | 064A | ي | 2 | Yeh |
| ئ | Yeh w/ Hamza Above | 0626 | Arabic | 064A | ي | 2 | Yeh |
| ٸ | High Hamza Yeh | 0678 | Kazakh | 064A | ي | 2 | Yeh |
| ے | Yeh Barree | 06D2 | Urdu | 064A | ي | 2 | Yeh |
| ۓ | Yeh Barree w/ Hamza Above | 06D3 | Urdu | 064A | ي | 2 | Yeh |
| ۑ | Yeh w/ 3 Dots Below | 06D1 | Malay | 064A | ي | 2 | Yeh |
| ؠ | Kashmiri Yeh | 0620 | Kashmiri | 064A | ي | 2 | Yeh |
| ؽ | Farsi Yeh w/ Inverted V | 063D | Azerbaijani | 064A | ي | 2 | Yeh |
| ؾ | Farsi Yeh w/ 2 Dots Above | 063E | Azerbaijani | 064A | ي | 2 | Yeh |
| ؿ | Farsi Yeh w/ 3 Dots Above | 063F | Azerbaijani | 064A | ي | 2 | Yeh |

FIG. 6A

| Confusable AS Char. | Confusable AS Char. Descript. | Unicode | Unicode Consortium Assigned Language | Funct. Code | Funct. Character | Funct. Group # | Funct. Description |
|---|---|---|---|---|---|---|---|
| گ | Gaf w/ Ring | 06B0 | Lahnda | 06AF | گ | 3 | Gaf |
| ڰ | Ngoeh | 06B1 | Sindhi | 06AF | گ | 3 | Gaf |
| ڳ | Gueh | 06B3 | Sindhi | 06AF | گ | 3 | Gaf |
| ڲ | Gaf w/ 2 Dots Below | 06B2 | Sindhi | 06AF | گ | 3 | Gaf |
| ڴ | Gaf w/ 3 Dots Above | 06B4 | Sindhi | 06AF | گ | 3 | Gaf |
| ګ | Kaf w/ Ring | 06AB | Pashto | 06AF | گ | 3 | Gaf |
| ڬ | Kaf w/ Dot Above | 06AC | Malay | 0643 | ك | 4 | Kaf |
| ک | Keheh | 06A9 | Farsi | 0643 | ك | 4 | Kaf |
| ڭ | Ng | 06AD | Sindhi | 0643 | ك | 4 | Kaf |
| ڮ | Kaf w/ 3 Dots Below | 06AE | Sindhi | 0643 | ك | 4 | Kaf |
| ڪ | Swash Kaf | 06AA | Sindhi | 0643 | ك | 4 | Kaf |
| ػ | Keheh w/ 2 Dots Above | 063B | Azerbaijani | 0643 | ك | 4 | Kaf |
| ؼ | Keheh w/ 3 Dots Below | 063C | Azerbaijani | 0643 | ك | 4 | Kaf |

FIG. 6B

| Confusable AS Char. | Confusable AS Char. Descript. | Unicode | Unicode Consortium Assigned Language | Funct. Code | Funct. Character | Funct. Group # | Funct. Description |
|---|---|---|---|---|---|---|---|
| ٹ | Teh w/ Ring | 067C | Pashto | 062A | ت | 5 | Teh |
| ٹ | Tteh | 0679 | Urdu | 062A | ت | 5 | Teh |
| ٻ | Rnoon | 06BB | Sindhi | 062A | ت | 5 | Teh |
| ډ | Dal w/ Ring | 0689 | Pashto | 062F | د | 6 | Dal |
| ڈ | Ddal | 0688 | Urdu | 062F | د | 6 | Dal |
| ڐ | Dal w/ Four Dots Above | 0690 | Urdu | 062F | د | 6 | Dal |
| ں | Noon Ghunna | 06BA | Urdu | 0646 | ن | 7 | Noon |
| ڼ | Noon w/ Ring | 06BC | Pashto | 0646 | ن | 7 | Noon |
| ڹ | Noon w/ Dot Below | 06B9 | NA | 0646 | ن | 7 | Noon |
| ھ | Heh Doachashmee | 06BE | Urdu | 0647 | ه | 8 | Heh |
| ۀ | Heh w/ Yeh Above | 06C0 | Farsi | 0647 | ه | 8 | Heh |
| ہ | Heh Goal | 06C1 | Urdu | 0647 | ه | 8 | Heh |
| ۃ | Teh Marbuta Goal | 06C3 | Urdu | 0647 | ه | 8 | Heh |

FIG. 6C

| Confusable AS Char. | Confusable AS Char. Descript. | Unicode | Unicode Consortium Assigned Language | Funct. Code | Funct. Character | Funct. Group # | Funct. Description |
|---|---|---|---|---|---|---|---|
| ة | Teh Marbuta | 0629 | Sindhi | 0647 | ه | 8 | Heh |
| ۿ | (Deprecated) Heh w/ Inverted V | 06FF | Sindhi | 0647 | ه | 8 | Heh |
| ڵ | Lam w/ Small V | 06B5 | Kurdish | 0644 | ل | 9 | Lam |
| ڶ | Lam w/ Dot Above | 06B6 | Kurdish | 0644 | ل | 9 | Lam |
| ڷ | Lam w/ 3 Dots Above | 06B7 | Kurdish | 0644 | ل | 9 | Lam |
| ڸ | Lam w/ 3 Dots Below | 06B8 | Arabic | 0644 | ل | 9 | Lam |
| ٽ | Teh w/ 3 Dots Above Downwards | 067D | Sindhi | 062B | ث | 10 | Theh |
| ڑ | Rreh | 0691 | Kurdish | 0631 | ر | 11 | Reh |
| ڒ | Reh With Small V | 0692 | Urdu | 0631 | ر | 11 | Reh |
| ڕ | Reh w/ Small V Below | 0695 | Kurdish | 0631 | ر | 11 | Reh |
| ٶ | High Hamza Waw | 0676 | Kazakh | 0648 | و | 12 | Waw |
| ۇ | U w/ Hamza Above | 0677 | Kazakh | 0648 | و | 12 | Waw |
| ۄ | Waw w/ Ring | 06C4 | Kashmiri | 0648 | و | 12 | Waw |

FIG. 6D

| Confusable AS Char. | Confusable AS Char. Descript. | Unicode | Unicode Consortium Assigned Language | Funct. Code | Funct. Character | Funct. Group # | Funct. Description |
|---|---|---|---|---|---|---|---|
| و | Kirghiz Oe | 06C5 | Kirghiz | 0648 | و | 12 | Waw |
| ۇ | U | 06C7 | Azerbaijani | 0648 | و | 12 | Waw |
| ۈ | Yu | 06C8 | Uighur | 0648 | و | 12 | Waw |
| ۉ | Kirghiz Yu | 06C9 | Kazakh | 0648 | و | 12 | Waw |
| ۊ | Waw w/ 2 Dots Above | 06CA | Kurdish | 0648 | و | 12 | Waw |
| ۋ | Ve | 06CB | Uighur | 0648 | و | 12 | Waw |
| ؤ | Waw w/ Hamza Above | 624 | Arabic | 0648 | و | 12 | Waw |
| ۏ | (Deprecated) Waw w/ Dot Above | 06CF | NA | 0648 | و | 12 | Waw |
| ؏ | Arabic Sign Misra | 060F | Poetic | 0639 | ع | 13 | Ain |
| آ | Alef w/ Madda Above | 0622 | Arabic | 0627 | ا | 14 | Alef |
| أ | Alef w/ Hamza Above | 0623 | Arabic | 0627 | ا | 14 | Alef |
| إ | Alef w/ Hamza Below | 0625 | Arabic | 0627 | ا | 14 | Alef |

FIG. 6E

| Arabic Script Char. | Charac. Descript. | Unicode | Unicode Consortium Assigned Language | Funct. Code | Funct. Character | Funct. Group # | Funct. Description |
|---|---|---|---|---|---|---|---|
| ٱ | Alef Wasla | 0671 | Koranic | 0627 | ا | 14 | Alef |
| ٲ | Alef w/ Wavy Hamza Above | 0672 | Baluchi | 0627 | ا | 14 | Alef |
| ٳ | (Deprecated) Alef w/ Wavy Hamza Below | 0673 | Kashmiri | 0627 | ا | 14 | Alef |
| ٵ | High Hamza Alef | 0675 | Kazakh | 0627 | ا | 14 | Alef |

FIG. 6F

| Confusable Character | Unicode | Functional code | Character In Term | Term as Unicode |
|---|---|---|---|---|
| k1 | Uk1 | Uk1 | book1 | Ubook1 |
| k2 | Uk2 | Uk1 | book2 | Ubook2 |
| k3 | Uk3 | Uk1 | book3 | Ubook3 |
| k4 | Uk4 | Uk1 | book4 | Ubook4 |
| k5 | Uk5 | Uk1 | book5 | Ubook5 |
| k6 | Uk6 | Uk1 | book6 | Ubook6 |
| k7 | Uk7 | Uk1 | book7 | Ubook7 |
| k8 | Uk8 | Uk1 | book8 | Ubook8 |
| k9 | Uk9 | Uk1 | book9 | Ubook9 |
| k10 | Uk10 | Uk1 | book10 | Ubook10 |

FIG. 8A

| Record A – book1 | Record B – book4 |
|---|---|
| Orig Content output A<br>Ubook1　　　　832<br>(Ub, Uo, Uo, Uk1) | Original Content Output B<br>Ubook4　　　　842<br>(Ub, Uo, Uo, Uk4) |
| Paired Functional Output<br>Ubook1　　　　834<br>(Ub, Uo, Uo, Uk1) | Paired Functional Output<br>Ubook1　　　　844<br>(Ub, Uo, Uo , Uk1) |
| Original Index<br>Ubook1　　　　836 | Original Index<br>Ubook4　　　　846 |
| Functional Index<br>----　　　　838 | Functional Index<br>Ubook1　　　　848 |

FIG. 8B

| Query #1 = book10  852 | Query #2 = book4  872 |
|---|---|
| Orig Query = Ubook10<br>Orig query entries =  854<br>Ub, Uo, Uo, Uk10 | Orig Query – Ubook4<br>Orig query entries =  874<br>Ub, Uo, Uo, Uk4 |
| Paired Funct query=Ubook1<br>Func query entries =  856<br>Ub, Uo, Uo, Uk1 | Paired Funct query = Ubook1<br>Func Query entries =  876<br>Ub, Uo, Uo, Uk1 |
| Record A  858<br>Hit (Ubook1) original index | Record A  878<br>Hit (Ubook1) original index. |
| Record B  860<br>Hit (Ubook1) functional index | Record B  880<br>Hit (Ubook1)functional index. |
| Complete Result Set  862<br>= Record A, Record B | Complete Result Set  882<br>= Record A, Record B |
| De-duplicated Result set  864<br>= Record A, Record B | De-duplicated Result set  884<br>= Record A, Record B |

FIG. 8C

| Query #1 = book10　　952 | Query #2 = book4　　972 |
|---|---|
| Orig query entries =<br>Ub, Uo, Uo, Uk10　　954 | Orig query entries =<br>Ub, Uo, Uo, Uk4　　974 |
| Paired Functional query #1<br>Func query entries =<br>Ub, Uo, Uo, Uk1　　956 | Paired Functional query #2<br>Func query entries =<br>Ub, Uo, Uo, Uk1　　976 |
| Expanded Functional query #1<br>= Ubook10 OR Ubook1　　958<br>= Ub, Uo, Uo, Uk10 OR Ub, Uo, Uo, Uk1 | Expanded Functional query #2<br>= Ubook4 OR Ubook1<br>=Ub, Uo, Uo, Uk4 OR Ub, Uo, Uo, Uk1<br>　　978 |
| Record A　　960<br>Hit (Ubook1) original index | Record A　　980<br>Hit (Ubook1) original index. |
| Record B　　962<br>Hit (Ubook1) functional index | Record B　　982<br>Hit(Ubook4) original index.<br>Hit (Ubook1)functional index. |
| Complete Result Set　　964<br>= Record A, Record B | Complete Result Set　　984<br>= Record A, Record B, Record B |
| De-duplicated Result set　966<br>= Record A, Record B | De-duplicated Result set　986<br>= Record A, Record B |

FIG. 8D

| | | Example 1 Query = علي "Ali"<br>Instances occurring in data set = 8 | | |
|---|---|---|---|---|
| Applied Method | Base Term | Query | Unicode Variants | Query Results | Comments |
| RBL | علي | علي | 0639 0644 0649 | 2 | Both results were for the term علیک (part of a common greeting) due to stemming rules applied by RBL |
| Query Expansion | علي | (علي OR علي OR علي) | 0639 0644 0649<br>0639 0644 06cc<br>0639 0644 064a | 5 | The (3) missing results were due to normalization rules in original index. |
| Invention | علي | علي OR علي | 0639 0644 064a<br>0639 0644 0649 | 8 | All 8 results were found in the functional index, despite normalization rules in original index. |

FIG. 9A

| Example 2 Query = شیمیائی "Chemical" Instances occurring in data set = 205 | | | | |
|---|---|---|---|---|
| Applied Method | Base Term | Query | Unicode Variants | Query Results | Comments |
| RBL | شیمیائی | شیمیائی | 0634 06cc 0645 06cc 0627 06cc 06cc | 39 | |
| Query Expansion | شیمیائی | شیمیائی OR شیمیائی OR شیمیائی OR شیمیائی OR شیمیائی OR شیمیائی OR شیمیائی OR شیمیائی | 0634 06cc 0645 06cc 0627 06cc 06cc<br>0634 064a 0645 064a 0627 064a 064a<br>0634 06cc 0645 06cc 0627 0626 0649<br>0634 06cc 0645 06cc 0627 06cc 0649<br>0634 064a 0645 064a 0627 0626 0649<br>0634 064a 0645 064a 0627 0626 064a<br>0634 06cc 0645 06cc 0627 0626 06cc<br>0634 064a 0645 064a 0627 064a 0649 | 197 | Prior art generated 8 common variants for Farsi intended to bring back >90% of results. It does not provide all possible variants. |
| Invention | شیمیائی | شیمیائی OR شیمیائی | 0634 06cc 0645 06cc 0627 06cc 06cc<br>0634 064a 0645 064a 0627 064a 064a | 205 | |

FIG. 9B

Example 3
Query = کرونا "Corona"
Instances occurring in data set = 53 (Arabic-4, Pashto -7, Farsi -27, Unknown – 15)

| Applied Method | Query | Unicodes for variants | Results | Comments |
|---|---|---|---|---|
| RBL | کرونا | Arabic:<br>0643 0631 0648 0646 0627<br>Pashto and Farsi:<br>06a9 0631 0648 0646 0627 | (4) Arabic<br>(5) Pashto<br>(20) Farsi | Separate queries were crafted for each language index within the database and the results for each query are shown. |
| Query Expansion | کرونا OR<br>کرؤنا OR<br>کروٻا OR<br>کرونا OR<br>کروڼا | 0643 0631 0648 0646 0627<br>06a9 0631 0648 0646 0627<br>0643 0631 0648 0646 0622<br>0643 0631 0648 0646 0623<br>0643 0631 0648 0646 0625 | (4) Arabic<br>(7) Pashto<br>(27) Farsi<br>(11) Language Unidentified | The 5 terms in the query include variants for Arabic, Farsi, and Pashto. |
| Invention | کرونا OR<br>کرونا | 0643 0631 0648 0646 0627<br>06a9 0631 0648 0646 0627 | (4) Arabic<br>(7) Pashto<br>(27) Farsi<br>(15) Language Unidentified | |

FIG. 9C

DE-CONFLICTION SYSTEM AND METHOD OF QUERYING A DATABASE INCLUDING CONFUSABLE CHARACTERS

FIELD OF THE INVENTION

This invention is generally directed to a processes for querying a database including confusable characters to improve query results.

BACKGROUND OF THE INVENTION

Although the Unicode standard provides a unique Unicode for each character of each language addressed by the standard, the manner in which these Unicodes are used often leads to confusion.

Languages which tend to be most affected by the manner in which Unicodes are used include, for example, Arabic script languages (i.e., languages using an Arabic writing system e.g., Arabic, Farsi, Dari, Pashto, Urdu, Kurdish, and Balochi) Korean, Russian, and Ukrainian. Confusion is sometimes caused by the fact that different Unicodes representing different characters display characters having the same visual appearance. This problem is known and has been documented by the Unicode Consortium, which publishes a list of confusable characters, including these visually-indistinguishable confusable characters along with their variants/alternatives at www.home.unicode.org. The character ى, having Unicode 0649 and the character ی, having Unicode value 06CC, provide an example of visually-indistinguishable confusable Arabic script characters. Another example of visually-indistinguishable confusable characters is illustrated in FIG. 1A. At reference 2, the characters كتاب forming the word ketab (which translates to book) are illustrated and at reference 4 additional characters كتاب forming the word ketab are illustrated. These characters are visually-indistinguishable and have the same meaning to Arabic script language experts, but the characters of reference 2 are associated with Unicodes 06A9, 062A, 0627, and 0628, and the characters of reference 4 are associated with Unicodes 0643, 062A, 0627, and 0628. When an alternate character which is visually-indistinguishable from the intended character is interchanged for the intended character, a variety of problems arise.

In other instances, visually-distinguishable characters are used interchangeably by the user or software. FIG. 1B provides an example of visually-distinguishable confusable characters. An Arabic Yeh (associated with Unicode 064A) is illustrated at reference 6, and a Farsi Yeh (associated with Unicode 06CC) is illustrated at reference 8. These characters can be distinguished by the dots underneath the Arabic Yeh which are not present in the Farsi Yeh. Another example of visually-distinguishable, interchangeable characters includes emojis. For example, a "smiling face" emoji (☺) and a "grinning face" emoji (😀) have different Unicodes but are often used interchangeably. Users and software developers often use certain visually-distinguishable characters interchangeably, treating them as variants/alternatives. The presence of visually-indistinguishable and visually-distinguishable but interchangeable characters in a database and/or in a query results in inconsistency, imprecision, and poor quality search results for queries against databases which contain these visually-indistinguishable and visually-distinguishable confusable characters.

In the case of visually-indistinguishable and visually-distinguishable confusable characters, the existence of some or all of the alternate/variant Unicodes is typically unknown to the searcher. As a result the searcher's query presents only the known Unicodes and running of the query against the database will not return results which would have been returned had all of the alternate Unicodes been utilized, despite the intent of the searcher to return those results. Although results vary depending on the characteristics of a particular database, testing of databases including Arabic script languages, shows that if a user is unaware of alternate Unicodes, relevant search results will not be included. When querying using the most common variant of the confusable, the result may miss only 20% of the relevant results. When querying a multi-language database using a less common variant, however, the results may miss 100% of the relevant results.

In some cases, the problems caused by confusables is further exacerbated by software developers who default to the most common Unicode variant to render a set of given characters, regardless of the originating language. For example, utilizing the copy-paste commands in connection with the Arabic character "ﺍ" having Unicode 0622 in now outdated versions of MICROSOFT EXCEL resulted in changing the Arabic character "ﺍ" having Unicode 0622 to the more common Arabic character "ﺍ" having Unicode 0627. In another example, a messaging application is designed to convert all Arabic script characters into the Arabic subset of characters.

In other cases, the problems caused by confusables is further exacerbated by language-specific keyboards. In instances where native speakers of Farsi, Dari, Pashto, Urdu, and other Arabic languages use language-specific keyboards, language specific Unicodes are associated with the characters typed by the user and are consistently applied. For example, if a Pashto user creates data including the term كتاب ("book") using a Pashto keyboard, the Pashto Unicodes associated with the data will be 06A9, 062A, 0627, and 0628. When a query is conducted for the term كتاب also using a Pashto keyboard, Pashto Unicodes assigned to the query term will likewise be 06A9, 062A, 0627, and 0628, and the search engine will correctly match the query terms with the data. Some applications (e.g., some SMS applications), however, do not provide Pashto or Urdu keyboards and therefore users desiring to type Pashto or Urdu SMS messages are required to use an Arabic keyboard. When a non-language specific keyboard is used to create the data, but a language specific keyboard is used to query the data, a mismatch between the Unicode values will occur. Thus, use or non-use of language specific keyboards increases the number of logical variants that must be included in a query to produce accurate search results.

Attempts to improve search results associated with databases including confusables includes the use of linguistics software (e.g., ROSETTE BASE LINGUISTICS ("RBL") sold by BASIS TECHNOLOGY CORPORATION) or machine translation tools to process the data to be queried. Use of these tools begins by identifying the language of the data to be queried utilizing, for example, language ID (LID). LID uses several factors and patterns within the data to identify the language associated with the data. For example, LID software identifies pattern strings within records of the dataset. For example, the pattern string "-ando" is identified as a pattern string commonly used in Spanish, Portugese, and Italian; less commonly used in Romanian, Afrikaans, Cebuano, and Tagalog; and as a part of 'borrowed words' in French, English, and German (e.g., cuando, mando, dictando, commando). Because LID must be able to identify a sufficient number of unique patterns within a record to accurately assess the language(s), generally datasets having smaller records (less than 3-4 full sentences of information) or records containing multiple languages will be difficult to assess. In addition, grammatical inconsistencies can affect the ability to accurately detect the language associated with the data. Another factor which degrades accurate language identification includes creation of data without using a language-specific keyboard or creation with a mismatched keyboard (e.g., an Arabic keyboard is used to type a Pashto SMS message, substituting Pashto characters with Arabic characters). When conducting a search of these messages, the LID may rely on the fact that the SMS messages were created using an Arabic keyboard to incorrectly identify the language of the SMS messages as Arabic rather than Pashto.

After language associated with the data (i.e., the target language) is identified, the linguistics software or the machine translation tool begins normalization based on the identified target language. Further, the original text is enriched by applying rules unique to each target language in order to improve the speed and accuracy of search engines and text analytics. For Arabic script languages, one machine translation tool applies two stages of normalization rules: (1) generic Arabic Script normalization and (2) language-specific normalization. Generic Arabic script normalization includes rules such as stripping away diacritic markers and spaces, converting all numbers to Arabic numbers, and combining certain character pairs to create a normalized token variant. Language-specific normalization is then applied to include such rules as converting yeh and kaf characters to their appropriate language specific characters. Other language-specific normalization includes replacing characters in a group with a common Arabic Unicode to represent all of the grouped characters. For example, Unicode 06A9 found in a Pashto or Arabic document is replaced with Unicode 0643 (the Unicode associated with Pashto and Arabic), however Unicode 06A9 found in a Farsi document is replaced with Unicode 06AF (the Unicode associated with Farsi). These language specific rules are numerous. For example, there may be 30-150 Arabic specific rules; 30-150 Pashto specific rules; 30-150 Farsi specific rules; etc. Despite all of these language specific rules, they only account for a small fraction of encoding variants that commonly occur within each language. Thus, identifying a proper replacement character in this method requires correct identification of the language associated with the document. Because the linguistics software/machine translation tool relies on perfect language identification prior to selecting the normalization rules to be applied, the prerequisite of proper LID is particularly problematic in environments where the data is insufficient to accurately determine the language, or where multiple languages reside. For example, environments with multiple Arabic script languages make language detection difficult due to similar lexicons, language structures, and character encoding.

In addition to normalizing the data using language-specific normalization, the linguistics software/machine translation tool also normalizes queries. For example, queries detected as Arabic are altered to include stems and lemmas. Thus, in order to query the database accurately, the end user must be familiar with the alteration rules applied for each language. Overall, even with stemming rules enabled, a test revealed that a machine translation tool failed to recall an average of 15% of relevant Farsi documents when querying using the most common Unicode variants, and 84% of relevant Farsi documents when querying using the second most common Unicode variants. Thus, there is a need for processing data and queries including confusable characters which does not rely on language detection to appropriately process and resolve Arabic script queries.

Another attempt to improve the accuracy of search results for databases containing confusable characters is provided by query expansion using language-dependent expanded Unicode Groups. This query expansion begins by identifying expanded Unicode groups. FIG. 2 provides a portion of a list of Arabic script characters to demonstrate the formation of expanded Unicode groups. Each character is listed along with a description of the character and the Unicode associated with the character. For each Arabic script character, the language(s) associated with the character has also been identified (A-Arabic; D-Dari; F-Farsi; K-Kurdish; M-Malay; P-Pashto; S-Sindhi; and U-Urdu). Next, each Unicode is assigned to an expanded Unicode group. Each expanded Unicode group represents a group of confusable characters (i.e., Unicodes in each group are known substitutes for other Unicodes in the group). As illustrated in FIG. 2 for example, Unicodes 06ab and 06af represent both characters KAF and GAF. When these characters are identified with the language Arabic, Malay, or Sindhi they are included with expanded Unicode group 1. When these characters are identified with Dari, Farsi, Pashto, or Urdu, however, they are included with expanded Unicode group 2. Thus, creation of these expanded Unicode groups is language dependent.

Having formed the language-dependent expanded Unicode groups, query expansion provides that when a query includes one character of the expanded Unicode group, the query is expanded to include all characters in the assigned expanded Unicode group. For example, if a user submits a query having Unicode 0643 which has been assigned only to expanded Unicode group 1, the query will be expanded to include not only Unicode 0643 but also all other Unicodes in expanded Unicode group 1 (i.e., 06A9, 06AC, 06AB and 06AF). In another example, if a user submits a query having Unicode 06AF, because Unicode 06AF is included in both expanded Unicode groups 1 and 2, the language associated with the query must first be determined. If the query is in Arabic, Malay, or Sindhi, for example, expanded Unicode group 1 will be used. On the other hand, if the language associated with the query is identified as Dari, Farsi, Pashto, or Urdu, expanded Unicode Group 2 will be used. Specifically, for example, if the language associated with the query is Arabic, the query including Unicode 06AF will be expanded to include not only Unicode 06AF but also Unicodes 0643, 06A9, 06AC, and 06AB (i.e., all Unicodes associated with expanded Unicode group 1). In contrast, if the language associated with the query is Urdu, the query will be expanded to include Unicodes associated with expanded Unicode group 2 (i.e., Unicodes 06AF and 06AB). Thus, an Urdu query expansion for gaf (Unicode 06AF), will not expand the query out to include an Arabic kaf as doing so would unnecessarily increase the amount of query variants with very little expectation that additional relevant results would be returned.

This language-dependent query expansion technique is used, for example, by certain online dictionaries. Adding all possible variants to each term in the query string would increase the size and complexity of queries by orders of magnitude and satisfying queries with this level of increased complexity would require additional computational resources to a degree untenable at scale. By taking language into account however, the query expansion technique may be managed. Specifically, utilizing language-dependent expanded Unicode groups limits the number of Unicodes in the expanded query and reduces the complexity of the expanded query to a manageable level. The number of variants to be included in the query depends on the type and number of characters used within a query string as well as the size of a database. Typically, 3-8 variants are provided per word, with some words having as many as 15 variants. Although language-dependent query expansion provides a means for managing the query, inaccurate language identification provides inaccurate/incomplete search results.

SUMMARY OF THE INVENTION

Briefly, the present invention provides a de-confliction system and method for improving the search results of a database including confusable characters. The systems provides at least one de-confliction script to address a set of Unicodes associated with confusable characters. The Unicodes are grouped to form functional groups and functional codes are assigned to each functional groups. Each de-confliction script includes instructions to replace the Unicodes associated with confusable characters with the assigned functional codes to create a functional output and use of the functional output upon querying the database increases the accuracy of the search results in a resource efficient manner.

BRIEF DESCRIPTION OF THE DRAWINGS

The organization and manner of the structure and operation of the invention, together with objects and advantages thereof, may best be understood by reference to the following description, taken in connection with the accompanying drawings, wherein like reference numerals identify like elements in which:

FIG. 1A illustrates an example of visually-indistinguishable confusable characters;

FIG. 1B illustrates an example of visually-distinguishable confusable characters;

FIG. 2 illustrates the formation of language-dependent expanded Unicode groups for use in query expansion techniques;

FIGS. 4A-4E illustrate the invention step of identifying Unicodes associated with unique characters;

FIG. 5 illustrates the invention step of identifying Unicodes associated with deprecated characters;

FIGS. 6A-6F illustrate the invention step of identifying Unicodes associated with confusable characters and forming functional groups;

FIGS. 8A-8D illustrate a simplified implementation of the method of the invention;

FIGS. 9A-9C provide a comparison of results obtained utilizing two prior art methods and the method of the invention.

DETAILED DESCRIPTION OF THE PREFERRED EMBODIMENT

Figure 3:
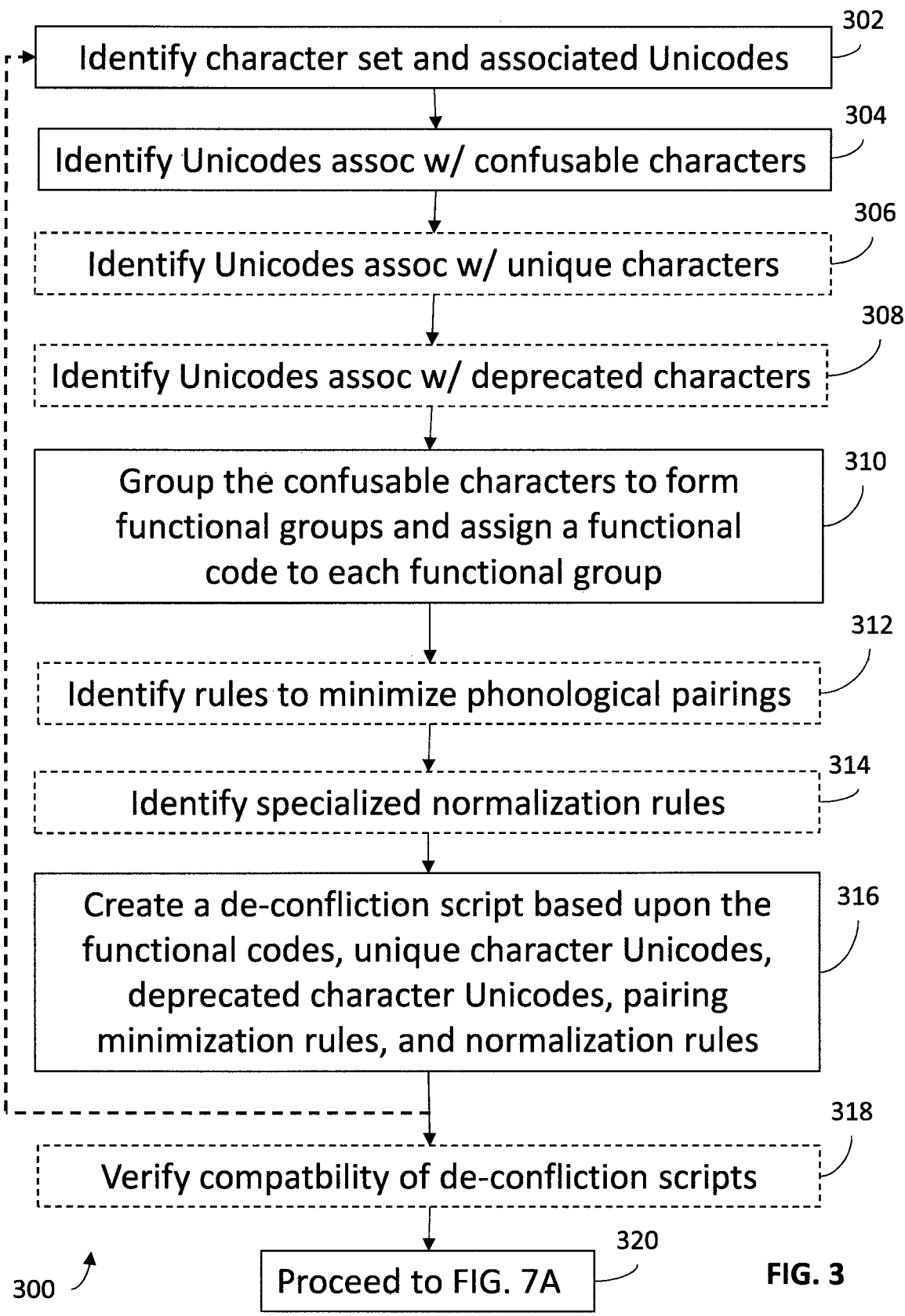
FIG. 3 illustrates a method of creating language-agnostic de-confliction scripts in accordance with the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The method of creating a universal script provided by language agnostic de-confliction scripts is illustrated in FIG. 3. As illustrated in FIG. 3, the method begins with the process of creating one or more de-confliction scripts. Each de-confliction script addresses a pre-determined set of characters and their associated Unicodes and provides a set of rules for processing an index or query to minimize the impact of confusable characters. For example, a first de-confliction script may address Unicodes associated with Arabic script languages; a second de-confliction script may address Unicodes associated with Russian and Ukrainian languages; a third de-confliction script may address Unicodes associated with emojis. An example of the method 300 of creating a de-confliction script illustrated is illustrated in FIGS. 4A-4E, 5, and 6A-6F and relates to characters provided by Arabic script languages. It is noted that each of FIGS. 4A-4E, 5, and 6A-6F includes a column titled "Unicode Consortium Assigned Language". Although the Unicode Consortium assigns each Unicode to a particular language, these characters are not necessarily unique to the language assigned by the Unicode Consortium and, in most instances, each character is used by multiple language keyboards. For example, the character ࢾ (Unicode 06BE) is assigned by the Unicode Consortium to Urdu (see, FIG. 6C); however, this same characters is also used in Kurdish. In some cases, the Unicode Consortium does not assign a language to a particular Unicode (e.g., Unicode 06B9, FIG. 6C), and, in other cases, the Unicode Consortium assigns the Unicode to a "non-language" group (e.g., Unicode 060F, FIG. 6E is assigned by the Unicode Consortium to a group identified as "poetic").

The method begins at step 302 where the character set and associated Unicodes are identified. For the example, the character set includes Arabic characters associated with Unicode range 0600-06FF; Arabic Supplement characters associated with Unicode range 0750-077F; Arabic Extended-A characters associated with Unicode range 08A0-08FF; Arabic Presentation Forms-A characters associated with Unicode range FB50-FDFF; and Arabic Presentation Forms-B characters associated with Unicode range FE70-FEFF. Characters falling outside the Unicode ranges identified are not impacted by the Arabic script de-confliction script.

Next, at step 304, from the Unicodes identified at step 302, the Unicodes associated with confusable characters are identified. FIGS. 6A-6F illustrate step 304 of an embodiment of Applicant's invention in which seventy confusable Arabic script characters have been identified. These seventy confusable characters include characters from fifteen Arabic script languages including, Arabic, Azerbaijani, Baluchi, Farsi, Kashmiri, Kazakh, Kirghiz, Koranic, Kurdish, Lahnda, Malay, Pahsto, Sindhi, Uighur, Urdu, and a Poetic character. For each confusable character, a description of the confusable Arabic script character, the Unicode associated with the confusable character, and the language associated with the confusable character is identified.

Next, and optionally at step 306, from the Unicodes identified at step 302, characters to be treated as unique are selected, and the Unicode associated with each unique character is identified. As will be described below, these unique characters will be excluded from functional groups. FIGS. 4A-4E illustrate step 306 in an embodiment addressing Arabic script languages. As illustrated in FIGS. 4A-4E, fifty-eight unique Arabic script characters have been identified along with a description of each unique character, the Unicode associated with the unique character, and the language to which the Unicode is assigned by the Unicode Consortium. It is noted that the character identified on line 11 of FIG. 4B is described as "(deprecated) Reh with dot below and dot above". The description of this character as "deprecated" is derived from the Unicode standard. Despite the description of this character as deprecated by the Unicode standard, the character is often found in databases and in this embodiment Applicant has chosen to identify this character as a unique character. Furthermore, as described below, characters identified as unique or deprecated in the Unicode standard may be treated as a confusable in this invention. It is noted that step 306 is optional as the de-confliction script may not need to address any unique characters.

Next, and optionally at step 308, from the Unicodes identified at step 302, characters to be treated as deprecated are identified, and the Unicode associated with each deprecated character is identified. As will be described below, these deprecated characters will be excluded from functional groups. FIG. 5 illustrates step 308 of an embodiment of Applicant's invention in which eleven deprecated Arabic script characters have been identified along with a description of the deprecated character, the Unicode associated with the deprecated character, and the language to which the Unicode is assigned by the Unicode Consortium.

Turning back to the Unicodes associated with confusable characters illustrated in FIGS. 6A-6F, it is noted that this list does not include excluded characters identified in steps 306 and 308 (e.g., the unique characters of FIGS. 4A-4E or deprecated characters of FIG. 5). Next, at step 310, the confusable characters are grouped together to form functional groups of confusable characters. Each functional group includes characters having the same meaning based upon the practical use of the characters. For example, a lower case letter "a" has the same meaning and is practically interchangeable with an upper case letter "A" and would be included in the same functional group in a Latin language de-confliction script. In another example, "thumbs-up" emojis of all colors are practically interchangeable and would be included in the same functional group in an emoji de-confliction script. As illustrated in FIGS. 6A-6F, for each confusable character Unicode, a functional code, a functional character, a functional group number, and a functional description are assigned. In the grouping illustrated in FIGS. 6A-6F, the seventy-five confusable Arabic script characters were grouped into sixteen functional groups each having an assigned functional code, an assigned functional character, and an assigned functional group number.

The assignment of Unicodes to functional groups is performed using information gathered by language experts to ensure application of the de-confliction script does not cause conflict amongst the Unicode ranges addressed by the de-confliction script. As a specific example, the characters ں (06BA), ڼ (06BC), ڹ (06B9) and ن (0646) are visually distinguishable characters that are sometimes used interchangeably by native speakers of multiple languages. For example, ں (06BA) requires a user to push "SHIFT+f" while using a MICROSOFT WINDOWS Urdu keyboard to produce. On the same keyboard, a user pushes "f" to produce ن (0646). Experts in the Urdu language identified that native Urdu speakers will often use ن (0646) in place of ں (06BA) when typing. In this example, given the Urdu word: پاؤں a native speaker may render it as پاؤن. While the rendered word is now technically misspelled, it does not change the meaning of the word as understood by another Urdu speaker, and in the case of a query, results for both renderings of the word would be desired. In addition, because ں (06BA) is not found on other keyboards within the range of the de-confliction script, placing it within this functional group does not create a conflict for other languages. Similar reasons exist for other characters selected to be a part of this functional group. Further, the character ن (0646) was selected as the functional character to represent this group, in this case because it was the most commonly used character in the functional group. Additional input such as compatibility with other functional groups, a character's presence in the Arabic keyboard (i.e., most common default keyboard in this de-confliction script's range in today's technology), and other factors were also considered by scientific language experts in selecting each group's functional character. By extensively vetting the assignment of functional codes, language experts ensure application of the de-confliction script does not cause conflict amongst languages using the character set addressed by the de-confliction script.

As illustrated in FIG. 3, the method of creating the universal script optionally includes step 312. Step 312 provides that that the universal script can account for minimal phonological pairings. Phonological pairs are pairs of words or phrases in a particular language that differ in only one phonological element (e.g., a phoneme, toneme, or chroneme) but have distinct meanings. Accounting for minimal phonological pairing ensures that non-relevant results are not returned. For example, additional minimal phonological pairing instructions may be provided to prevent certain conversions. In English, for example, minimal phonological pairing instructions for "k" and "c" would prevent conversion of the word "kite" to "cite" because "cite" is a meaningful word. Although minimal pairing is recommended, it is also time consuming and resource intensive and the process 300 may proceed without identifying rules to minimize pairings.

Optionally, at step 314, other specialized normalization rules may be defined. Specialized normalization rules include, for example, stripping diacritics or accounting for zero-width non-joiners. Special normalization ensures that data is consistent and condensed. For example, in most Arabic script languages, diacritics represent vowel sounds and their use is considered optional. کِتَاب and کتاب are both recognized as meaning "book" with respective Unicode values of (\u0643\u0650\u062a\u064e\u0627\u0628\u064c) vs. (\u0643\u062a\u0627\u0628). Stripping diacritics (i.e., removing the bolded Unicode values) will create consistency without altering meanings and will beneficially reduce the size of the index and improve recall. However, in some instances, keeping diacritics is desired to improve accuracy. For example, if the database contains multiple Arabic dialects, keeping diacritics may improve precision and help text analytics running against the data to determine dialects. This is similar to orthographical differences in American and British English (flavor vs. flavour) or if English pronunciations were spelled out ('park the car' vs. 'pahk the cahr'). As noted above, this step is optional and provides the user the ability to select which special normalization rules to apply while considering: precision, recall, system performance, text analytics, storage capacity, and various other factors.

At step 316, a de-confliction script is created using the results of steps 304-314. Specifically, the de-confliction script provides a set of rules to be applied to the records of databases and queries to create a functional output, as will be described below. The de-confliction script takes into account characters to be excluded (e.g., the unique characters identified at step 306 and the deprecated characters identified at step 308, if any), the functional groups and functional codes assigned to the confusable characters at step 310, and any rules to minimize pairings and normalization rules identified at steps 312 and 314.

With respect to confusable characters identified at step 304, the de-confliction script includes instructions to identify the functional group associated with each confusable character in the database and replace the Unicode associated with the confusable character with the assigned functional code. It is noted, that language identification is not required in order for the de-confliction script to substitute the confusable character Unicode with a functional code. Because the functional groups may include any number of confusable character variants, the de-confliction scripts provides the ability to address many variations of the confusable characters with a single functional code. In addition, the universal script addresses the confusable characters regardless of the manner in which the confusable character resulted. In one example, the confusable characters may be present in a record as a result of the conversion of one variant of the confusable character to another variant of the confusable character when the data was sent from one database/program/digital format to another database/program/digital format. In another example, the confusable character in the record may result from the conversion of data when copying and pasting data in a Word document into an email. In yet another example, the confusable character may occur in a query typed on a language-specific keyboard which does not match the language of the query words typed, or the confusable character in the record occurring when data is sent from a first database utilizing a first set of normalization rules to a second database utilizing a second set of normalization rules.

Creation of the de-confliction script at step 316 provides handling instructions for Unicodes associated with excluded characters (e.g., characters identified as unique or deprecated at steps 306 and 308). These handling instructions provide that the Unicodes associated with excluded characters are not altered (i.e., the Unicode of the excluded character is not replaced with a functional code but rather is transferred "as-is" to the functional output). As noted above, the characters identified as "deprecated" under a Unicode standard are not required to be treated as deprecated in the invention. For example, the Unicode standard identifies Unicode 06FF ("Heh with inverted V") as a deprecated character. As illustrated in FIG. 6D, this embodiment of the invention identifies Unicode 06FF with functional group 8 and functional code 0647. Associating Unicode 06FF with functional code 0647 rather than treating it as a deprecated character provides the ability to query on any character in functional group 8 and returns results for Unicode 06FF.

As noted above, many languages suffer from confusable characters. Multiple de-confliction scripts may be created to address the confusables found in different languages or character sets (e.g., emojis) present in the database or in the queries to be run. After creation of a de-confliction script at 316, the process may return to step 302 if additional de-confliction scripts are desired to address the additional languages/character sets. If it is anticipated that queries are to be run on a database including Arabic and Chinese documents, for example, after the creation of an Arabic script de-confliction script, the process may return to step 302 where the Chinese character set and the associated Unicodes are identified. Upon completion of steps 304-314, at step 316, a Chinese de-confliction script is created. Steps 302-316 are repeated until all the de-confliction scripts needed to address the confusable characters in the database have been created.

Next, at step 318, the compatibility of the various de-confliction scripts is verified. For example, the de-confliction scripts are compatible if each Unicode is addressed by a single de-confliction script. Because each de-confliction script addresses the Unicodes associated with a particular character set, the de-confliction scripts are compatible with each other (i.e., application of one de-confliction script on a record does not affect the application of another de-confliction script on the same record). For example, because the Arabic script de-confliction script only applies to characters falling within ranges of Unicode values relating to Arabic script characters (e.g., Arabic (0600-06FF); Arabic Supplement (0750-077F); Arabic Extended-A (08A0-08FF); Arabic Presentation Forms-A (FB50-FDFF); and Arabic Presentation Forms-B (FE70-FEFF)), characters falling outside the Arabic script Unicode ranges will not be impacted by the Arabic script de-confliction script.

Figure 7A:
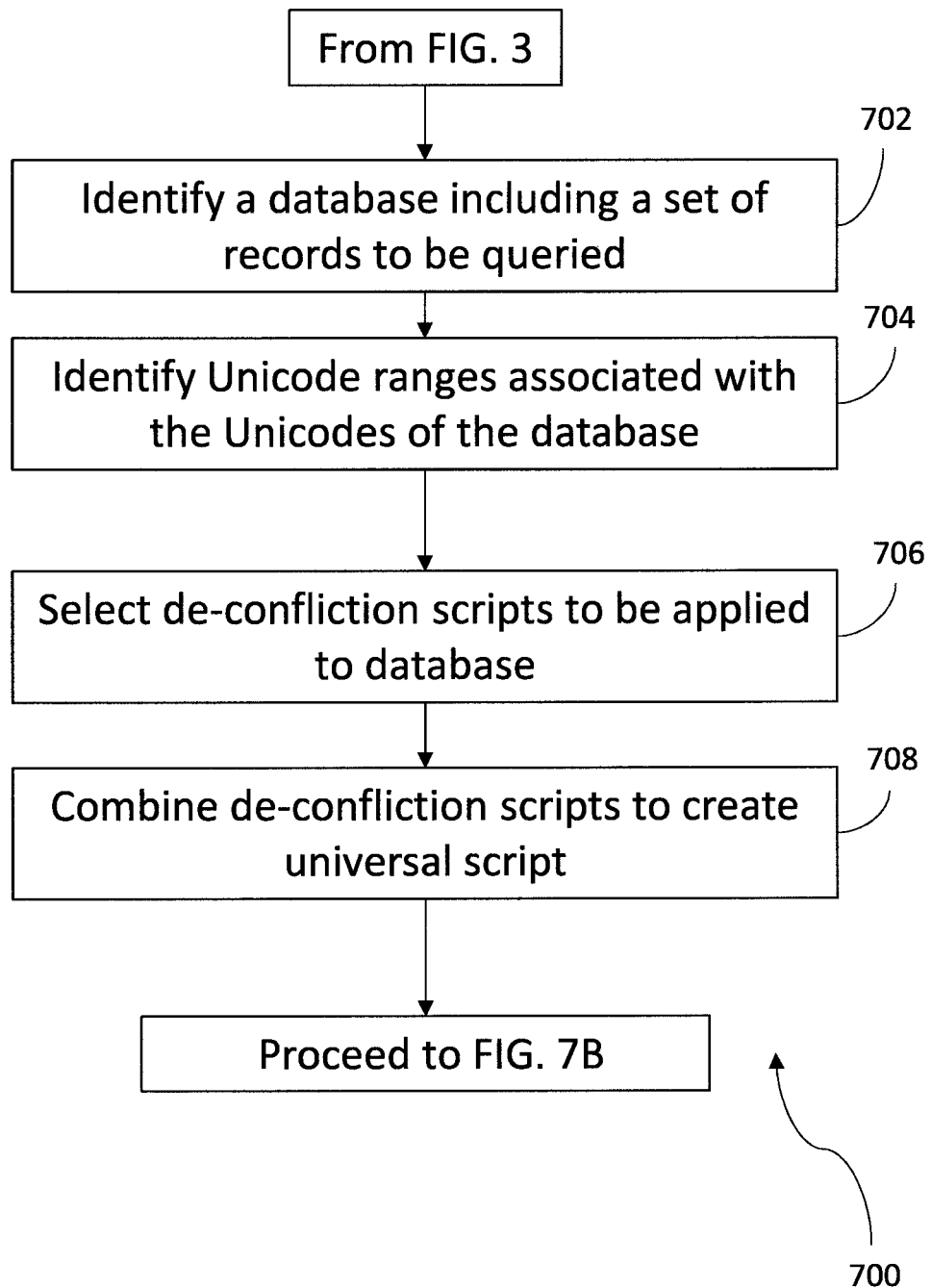
FIG. 7A illustrates the method of preparing a universal script in accordance with the invention.

Once the de-confliction script(s) have been created, the method of the present invention proceeds to method 700 of FIG. 7A where a universal script is prepared. The method 700 begins with step 702, where a database including a set of records to be queried is identified.

Next, at step 704, the Unicode ranges associated with the Unicodes of the database are identified. A variety of methods may be used to identify the Unicode ranges. For example, Unicode ranges associated with a sample of the data may be identified. Alternatively, a statistical analysis may be utilized to provide high and low Unicode values. It is noted that this step of identifying the Unicode ranges associated with the Unicodes does not require that the language associated with the database be identified. Unlike LIDs which require an analysis of patterns within the database or set of records to determine the languages associated with the database, this step merely requires the Unicodes and Unicode ranges associated with the database to be identified.

Next, at step 706, based upon the Unicode ranges identified at step 704, the de-confliction script(s) to be applied to the database are selected. The selection of de-confliction scripts to be applied is based upon the user's understanding of the database. For example, the user may expect certain languages to be present in the database and may choose the de-confliction scripts based upon these expected languages. Ideally de-confliction scripts are selected by identifying the Unicode ranges within the database. For example, Unicode ranges for the database may be identified by identifying the Unicode ranges associated with a sample of the data. Alternatively, the Unicode ranges associated with the database may be identified by using statistical analysis to provide high and low Unicode values. Notably, no identification of the languages in the database is required.

Figure 7B:
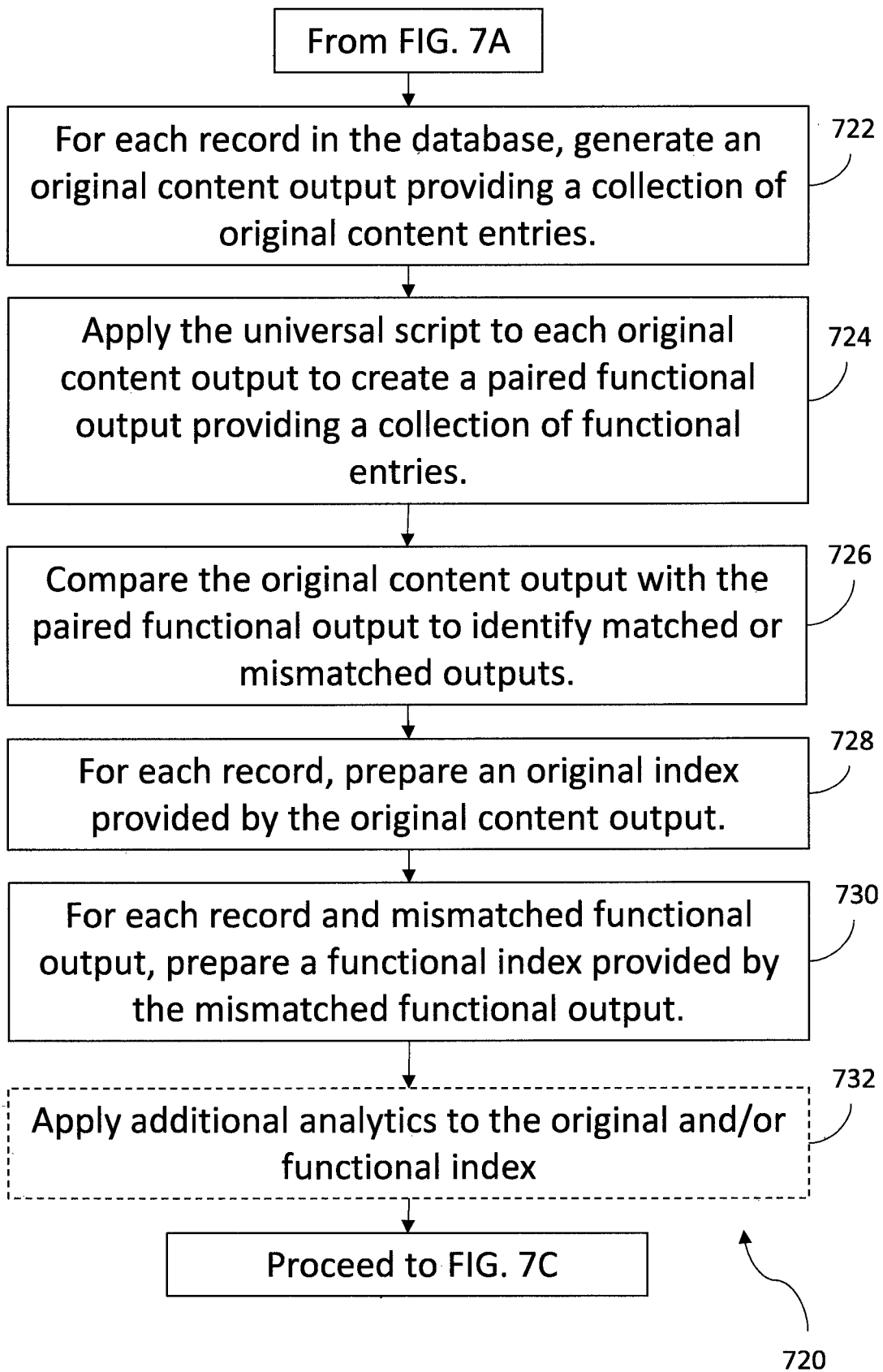
FIG. 7B illustrates the method of preparing original and functional indexes for records of the database to be queried in accordance with the invention.

Next, at step 708, the selected de-confliction script(s) are combined to create a universal script (i.e., a universal rule set), and the method proceeds with the steps illustrated in FIG. 7B.

FIG. 7B illustrates the method 720 of creating original and functional indexes. The method of creating the indexes begins at step 722 where each record in the database containing text is parsed to extract the text and generate an original content output. The original content output for each record includes a collection of original content entries.

Next, at step 724, the universal script is applied to the original content output to create a paired functional output. Each paired functional output provides a collection of functional output entries resulting from the application of the universal script. Each functional output entry corresponds to and is derived from an original content entry from the original content output with which the functional output is paired. Application of the universal script results in one of two possible outcomes. First, for confusable characters, the functional output entry is provided by substituting the Unicode associated with the original content entry with the assigned functional code (e.g., Unicode 0629 representing an original content entry is substituted with functional code 0647 in the functional output). Second, for all other characters (i.e., all characters other than confusable characters, including unique characters, deprecated characters, and even characters from languages outside the range of the selected de-confliction scripts), the corresponding functional output entry will exactly match the Unicode of the corresponding original content entry of the paired original content output. It is noted that language detection is not required in order to create this paired functional output.

Next, at step 726, for each record, each entry of the original content output (i.e., the Unicode of the original content output) is compared with the corresponding entry of the paired functional output resulting from application of the universal script (e.g., the Unicode provided by the original content entry is compared with the corresponding functional code (or the original Unicode, in the event the Unicode was not replaced with a functional code)) to determine whether the corresponding entries are matched or mismatched. An original content output and its paired functional output are determined to be matched outputs if all corresponding entries are matched. An original content output and its paired functional output are determined to be mismatched outputs if any corresponding entries are mismatched.

Next, at step 728, for each record, all original content outputs are indexed to create an original index, and the original index is included as a unique field within the corresponding record.

Next, at step 730, for each record and mismatched outputs, the functional output is retained, and, for matched outputs, the functional outputs are discarded. The retained functional outputs are indexed to provide a functional index included as a unique field within the corresponding record. Specifically, in instances where the original content output exactly matches the paired functional output, only an original index is created in the record. In instances where the original content output and the paired functional output are mismatched, however, the record includes an original index and a separate functional index.

Next, and optionally at step 732, additional analytics may be applied to the original and/or functional index to further improve query results. For example, a term frequency-inverse document frequency (TF-IDF) tool may be utilized to determine how important a particular term is to a particular document.

Figure 7C:
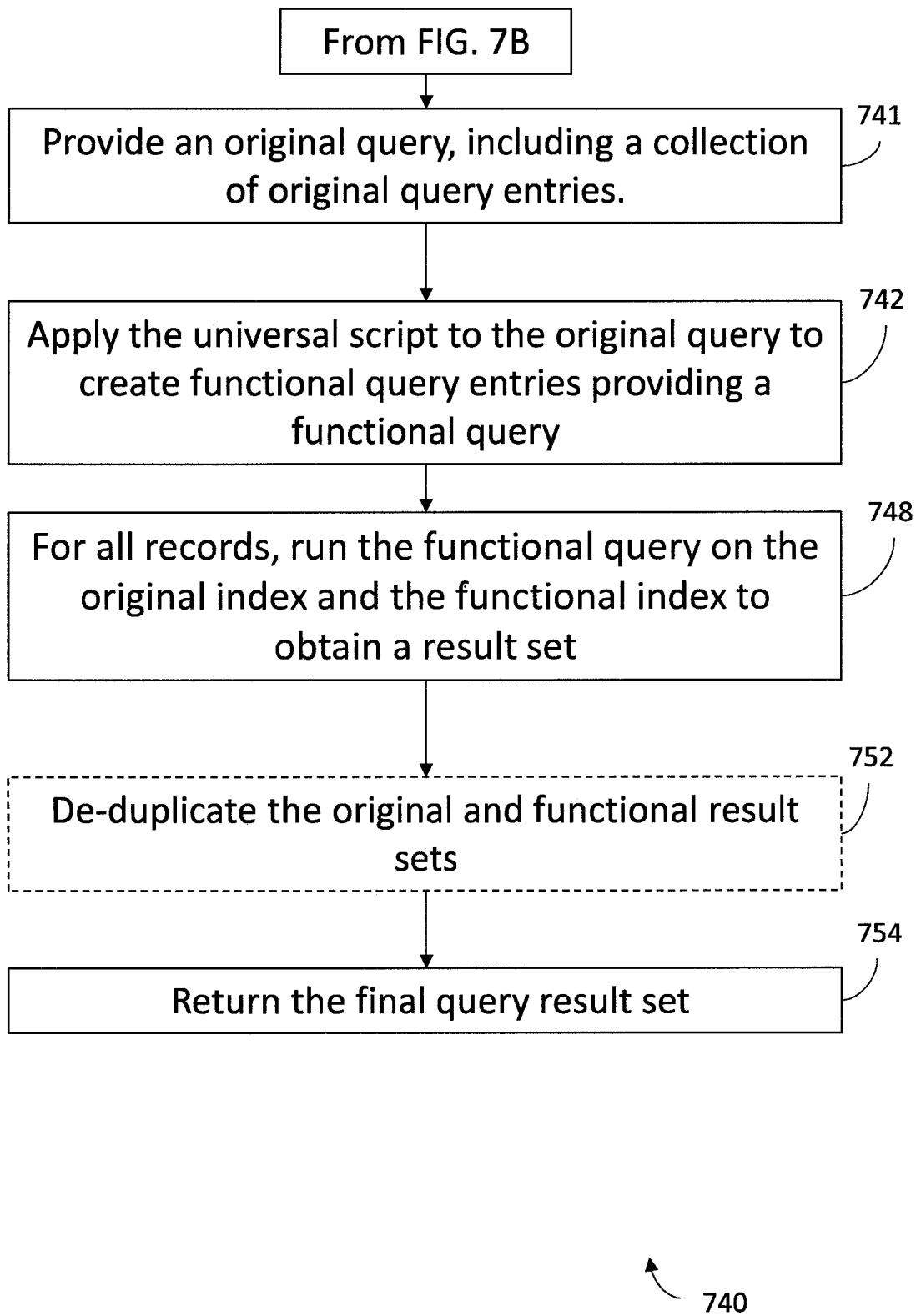
FIG. 7C illustrates the method of querying the records of a database in accordance with the invention using a functional query.
Figure 7D:
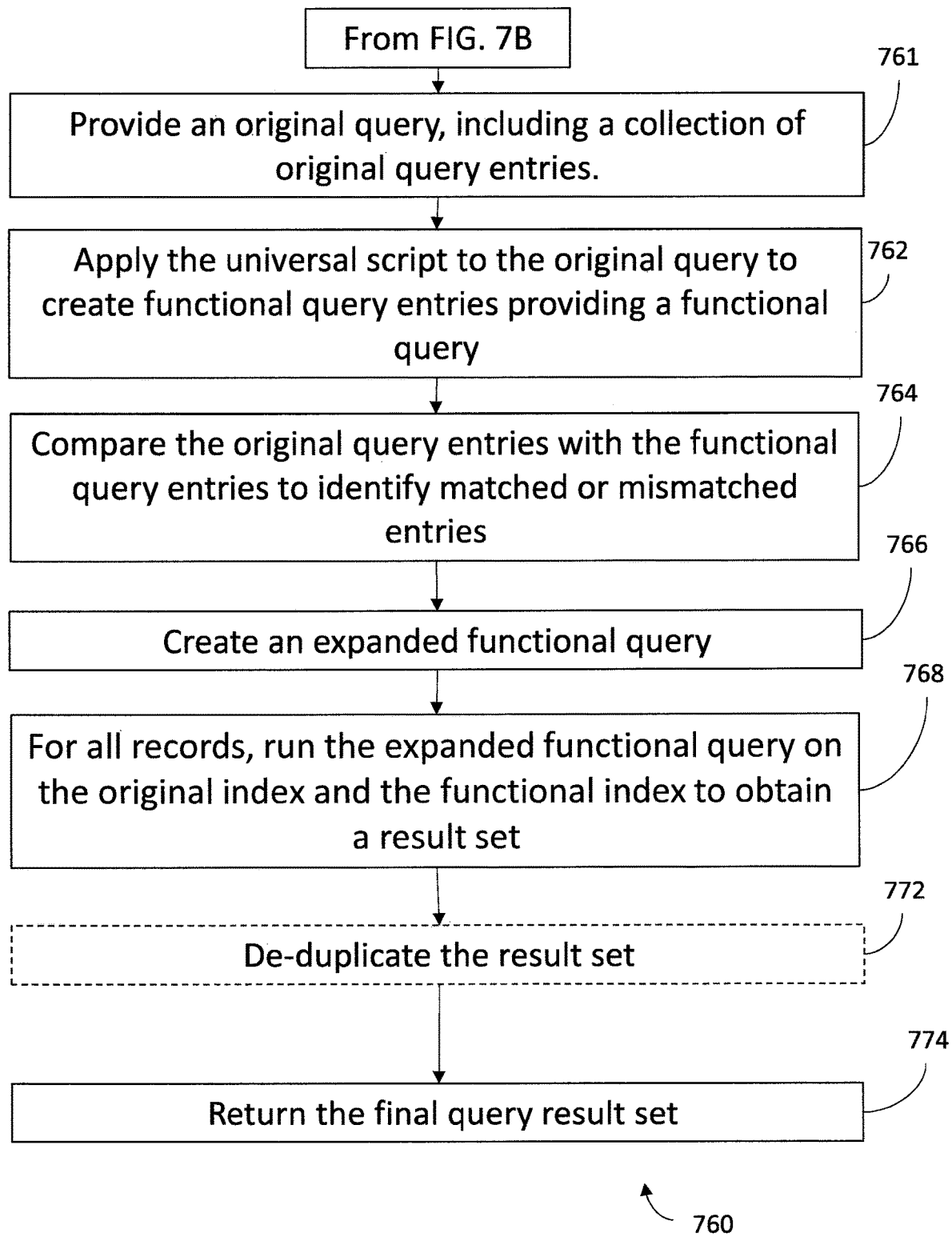
FIG. 7D illustrates the method of querying the records of a database in accordance with the invention using an expanded functional query.

The method of the invention proceeds to the method 740 of querying the database as illustrated in FIG. 7C using functional code substitution or, alternatively, to method 760 of querying the database as illustrated in FIG. 7D using functional code substitution along with query expansion.

FIG. 7C illustrates the functional code substitution query method 740.

An original query is provided at step 741. The original query includes a collection of original query entries.

At step 742, the universal script is applied to the original query. The universal script applied at step 742 is the same universal script applied to the original content output at step 724. Application of the universal script to the original query creates functional query entries which together provide a functional query. Application of the universal script results in one of two possible outcomes for each corresponding functional query entry. First, for confusable characters, the corresponding functional query entry is provided by substituting the Unicode of the original query entry with the functional code assigned to the confusable character. Second, for all excluded characters (i.e., all characters other than confusable characters, including unique characters, deprecated characters, and even characters from languages outside the range of the selected de-confliction scripts), the functional query entry is provided by matching the functional query entry to the corresponding original query entry (i.e., the Unicode) as-is. The collection of functional query entries provides a functional query.

The process proceeds to step 748 where the functional query is run on the original and functional indexes of each database record to obtain a search result set including all records for which a match is identified between the functional query and the original or functional index.

Optionally, at step 752, the search result set may be de-duplicated in order to eliminate duplicate instances of the same record in the search results.

At step 754, the final query result set (i.e., the search result set or the de-duplicated search result set) is returned to the user/querier.

FIG. 7D illustrates an alternative query method 760 combining functional code substitution along with query expansion.

An original query is provided at step 761 including a collection of original query entries.

At step 762, the universal script is applied to the original query. The universal script applied at step 762 is the same universal script applied to the original content output at step 724. Application of the universal script to the original query creates functional query entries derived from and corresponding to the original query entries. Application of the universal script results in one of two possible outcomes for each corresponding functional query entry. First, for confusables characters, the corresponding functional query entry is provided by substituting the Unicode of the original query entry with the functional code assigned to the confusable character. Second, for all excluded characters (i.e., all characters other than confusable characters, including unique characters, deprecated characters, and even characters from languages outside the range of the selected de-confliction scripts), the functional query entry is provided by matching the functional query entry to the corresponding original query entry (i.e., the Unicode) as-is. The collection of functional query entries provides a functional query.

Next, at step 764, each original query entry (i.e., the Unicode) is compared with the corresponding functional query entry resulting from application of the universal script (e.g., the functional code or the original Unicode, in the event the Unicode was not replaced with a functional code) to determine whether the paired entries are matched or mismatched.

Next, at step 766, the original query is expanded to provide an expanded functional query. Specifically, for each instance in which there is a mismatch between the original query entry and the corresponding functional query entry, the original query is expanded, using an OR clause to include the functional query entry in the expanded functional query. If the original query entry and the corresponding functional query entry match, the functional query entry is discarded (i.e., the original query is not expanded to include the functional query entry).

The process proceeds to steps 768 where the expanded functional query is run on the original and functional indexes of each database record to obtain a search result set including all records for which a match is identified between the expanded functional query and the original index or between the expanded functional query and the functional index.

Optionally, at step 772, the results may be de-duplicated in order to eliminate duplicate instances of the same record in the search results.

At step 774, the final query result set is returned to the user/querier.

Although it is anticipated that the query method of FIG. 7C which provides for substitution of Unicodes with functional codes without query expansion, will successfully identify all intended results, the query can be expanded as described in connection with FIG. 7D in order to account for the possibility that the functional index was not properly formed at step 730. For example, in the event new records are added to an existing database, it is possible that the steps for creating the functional index are applied only to the newly added records. In such circumstances, when the functional index is missing, application of the expanded functional query on the original index provides a backstop to ensure the performance of the invention will at a minimum match prior art query expansion methods but likely will remain an improvement over such methods despite the missing functional index. The method of the present invention is further illustrated in FIGS. 8A-8D utilizing a simplified example based upon a fictional language. To begin, the method of FIG. 3 is utilized to create a de-confliction script to address confusable characters in the fictional language. At step 302, the character set utilized by the fictional language is identified along with the Unicodes associated with the characters. Next, at step 304, from the character set identified at step 302, the confusable characters and associated Unicodes are identified. In this simplified example, confusable characters k1, k2, k3, k4 k5, k6, k7, k8, k9, k10 (representing different variations of the character "k" used in the fictional language) and the associated Unicodes Uk1, Uk2, Uk3, Uk4, Uk5, Uk6, Uk7, Uk8, Uk9, and Uk10 are identified. In this simplified example, we will skip steps 306-308 and proceed to step 310 where the characters k1, k2, k3, k4, k5, k6, k7, k8, k9, k10, are identified as confusable characters; grouped in a functional group; and "Uk1" is the functional code assigned to the functional group.

In this simplified example, the optional steps of identifying rules to minimize phonological pairings and specialized normalization rules are skipped and the process proceeds to step 316 where a fictional language de-confliction script is created and provides instructions/rules for the replacement of the Unicodes Uk1, Uk2, Uk3, Uk4, Uk5, Uk6, Uk7, Uk8, Uk9, Uk10 with the functional code "Uk1". Finally, in this simplified example, only one de-confliction script is created, therefore the step of verifying compatibility of the de-confliction scripts at step 318 is skipped and the method proceeds to the method 700 of preparing the universal script.

At step 702, a database to be queried is identified. In this example, the database to be queried relates to a data set including Documents A and B, for example, which contain text written in the fictional language. Each document in the data set is represented by a record in a database. Records A and B of the database correspond, respectively, to Documents A and B, for example.

At step 704, a sample of database records are reviewed, and the Unicode range identified with the database includes Uk1-Uk10. Based upon the Unicode range, the fictional language de-confliction script is selected at step 706. Because the Unicode range identified at step 704 is addressed by only one de-confliction script (i.e., the fictional language de-confliction script), the universal script resulting from step 708 is provided by the fictional language de-confliction script selected at step 706. Next, the method proceeds to method 720, where the original and functional indexes for each record is created.

As noted in FIG. 8B, the text associated with Record A includes the term "book1" with the character "k1", and the text associated with Document B includes the term "book4" with the character "k4". Applying steps 722-730 to Record A begins with step 722, and an original content output is generated for Record A by parsing Record A to extract the text and generate original content output A. As noted in FIG. 8B, original content output A includes original content term Ubook1 provided by entries Ub, Uo, Uo, Uk1 (see box 832).

At step 724, the universal script resulting from step 708 is applied to original content output A to create a paired functional output A. As noted above, the universal script provides for the replacement of Unicode Uk1 with functional code Uk1. The paired functional output resulting from application of the universal script to original content output A, therefore, is paired functional output A Ubook1, including corresponding functional output entries Ub, Uo, Uo, Uk1 (see box 834).

At step 726, entries of original content output A are compared with corresponding functional entries of paired functional output A to determine whether the functional codes of paired functional output match the corresponding Unicodes of the original content output. The comparison identifies that all entries of the original content output match the corresponding entries of the paired functional output (i.e., Ub, Uo, Uo, Uk1 matches Ub, Uo, Uo, Uk1). Thus, the outputs are determined to be a match.

At Step 728, an original index for Record A is created and includes all the original content output for Record A (i.e., Ubook1 represented by entries Ub, Uo, Uo, Uk1, see box 836).

At step 730, for Record A and mismatched outputs, a functional index is created. Because the comparison at step 726 identified matched outputs, the functional output may be discarded and no functional index is created for Record A (see box 838).

Steps 722-730 are repeated for Record B. At step 722, an original content output is generated for Record B by parsing Record B to extract the text and generate original content output B. As noted in FIG. 8B, original content output B includes original content term Ubook4 provided by entries Ub, Uo, Uo, Uk4 (see box 872).

At step 724, the universal script resulting from step 708 is applied to original content output B to create a paired functional output B. As noted above, the universal script provides for the replacement of Unicode Uk4 with functional code Uk1. The paired functional output resulting from application of the universal script to original content output B, therefore, is paired functional output B Ubook1 including corresponding functional output entries Ub, Uo, Uo, Uk1 (see box 844).

At step 726, entries of original content output B are compared with corresponding functional entries of paired functional output B to determine whether the functional codes of the paired functional output match the corresponding Unicodes of the original content output. The comparison identifies that at least one entry (Uk4) of the original content output (see box 842) does not match the corresponding entry (Uk1) of the paired functional output (see box 844). Thus, the outputs are determined to be a mismatch.

At Step 728, an original index for Record B is created and includes all the original content output entries for Record B (i.e., book4 represented by entries Ub, Uo, Uo, Uk4 is associated with Ubook4, see box 846).

At step 730, for Record B and mismatched outputs, a functional index is created. Because the comparison at step 726 identified mismatched outputs, the functional output is retained, and a functional index is created for Record B including the term book1 represented by entries Ub, Uo, Uo, Uk (i.e., Ubook1, see box 848).

As a result of the process 720, Record A contains entries in an original index for the term (book1) and no functional index, and Record B contains entries in an original index for the term (book4) and entries in a functional index for the term (book1). In this example, no additional analytics are applied at step 732.

Next, the method proceeds to method 740 where the database is queried. FIG. 8C illustrates the querying process in connection with the records of the database illustrated in FIG. 8B. Two queries are demonstrated in FIG. 8C. Original query #1 seeks the term book10 with variation 10 of the character k (i.e., k10) represented by Unicode Uk10 (see box 852). Original query #2 seeks the term book4 with variation 4 of the character k (i.e., k4) represented by Unicode Uk4 (see box 874).

Addressing first original query #1, at step 741, the original query book10 is identified and includes original query entries Ub, Uo, Uo, Uk10 (see box 854). At step 742, the universal script is applied to original query to create functional query entries providing a functional query. Specifically, for each confusable character in the original query, each Unicode of the original query entry is substituted with the assigned functional code to provide a functional query entry. For excluded characters and other original query entries with special handling instructions, the original query entry will not be altered (i.e., the functional query entry will match the original query entry). As illustrated in box 856, application of the universal script to the original query provides a paired functional query in which the Unicode Uk10 is replaced with the functional code Uk1 (see box 856).

At step 748, functional query #1 ("Ubook1") is executed on the indexes of each record in the data set (i.e., Record A and Record B). Functional query #1 is first applied to the indexes of Record A. Applying functional query #1 ("Ubook1") to Record A's original index including entry Ubook1 (see box 836), there is a query hit on Ubook1 (see box 858). Record A, therefore, is included in the result set (see block 862). It is noted that Record A does not include a functional index to which functional query #1 need be applied (see FIG. 8B, box 838).

Functional query #1 is next applied to the indexes of Record B. Applying functional query #1 ("Ubook1") to Record B's original index, including entry Ubook4 (see box 846), does not result in a query hit. Applying functional query #1 ("Ubook1") to Record B's functional index (Ubook1, see box 848), results in a query hit on Ubook1 (see box 860). A complete set of search results is provided by combining results obtained searching the original and functional indexes for query #1 (see block 862 of FIG. 8C). At step 752, the de-duplication step is performed to eliminate duplicate results occurring in the complete result set. In this case, the execution of query #1 on the original and functional indexes associated with Records A and B resulted in a single instance of Record A and a single instance of Record B (see box 862). In this case, no duplication exists in the complete search result set; therefore, deduplication does not alter the result set, and the final result set resulting from de-duplication is the same as the complete result set (see block 864 of FIG. 8C).

Addressing next original query #2, at step 741, the original query book4 is identified and includes original query entries Ub, Uo, Uo, Uk4 (see box 874). At step 742, the universal script is applied to original query to create functional query entries providing a functional query. Specifically, for each confusable character in the original query, each Unicode of the original query entry is substituted with the assigned functional code to provide a functional query entry. For excluded characters and other original query entries with special handling instructions, the original query entry will not be altered (i.e., the functional query entry will match the original query entry). As illustrated in box 876, application of the universal script to the original query entries provides a paired functional query in which the Unicode Uk4 is replaced with the functional code Uk1 (see box 876).

At step 748, functional query #2 ("Ubook4") is executed on the indexes of each record in the data set (i.e., Record A and Record B). Functional query #2 is first applied to the indexes of Record A. Applying functional query #2 ("Ubook1") to Record A's original index, including entry Ubook1 (see box 836), there is a query hit on Ubook1 (see box 878). Record A, therefore, is included in the original result set, see block 882. It is noted that Record A does not include a functional index to which functional query #2 need be applied (see FIG. 8B, box 838).

Functional query #2 (Ubook1) is next applied to the indexes of Record B. Applying functional query #2 ("Ubook1") to Record B's original index, including entry Ubook4 (see box 846), does not result in a query hit. Applying functional query #2 ("Ubook1") to Record B's functional index (Ubook1, see box 848), results in a query hit on Ubook1 (see box 880).

A complete set of search results is provided by combining results obtained searching the original and functional indexes for query #2 (i.e., Record A, Record B as shown in block 882 of FIG. 8C). At step 752, the de-duplication step is performed to eliminate duplicate results occurring in the complete result set. In this case, the execution of query #2 on the original and functional indexes associated with Records A and B resulted in a single instance of Record A and a single instance of Record B (see box 882). In this case no duplication exists in the complete search result set therefore, deduplication does not alter the result set and the final result set resulting from de-duplication is the same as the complete result set (see block 884 of FIG. 8C).

FIG. 8D demonstrates application of the expanded functional query method 760 of FIG. 7D. Again, query #1 seeks the term book with variation 10 of the character k (i.e., book10) represented by book10 (see box 952), and query #2 seeks the term book with variation 4 of the character k (i.e., book4) represented by book4 (see box 972).

At step 761, the original query #1 is identified (book10) and includes original query entries Ub, Uo, Uo Uk10 (see box 954). At step 762, the universal script is applied to original query to create functional query entries providing a functional query. Specifically, for each confusable character in the original query, each Unicode of the original query entry is substituted with the assigned functional code to provide a functional query entry. For excluded characters and other original query entries with special handling instructions, the original query entry will not be altered i.e., the functional query entry will match the original query entry. As illustrated in box 956, application of the universal script to the original query provides a paired functional query in which the Unicode character Uk10 in Ubook10 is replaced with the functional code Uk1 (see box 956).

Next, at step 764, each original query entry (i.e., the Unicode of the original query) is compared to the corresponding functional query entry resulting from application of the universal script (e.g., the functional code or the original Unicode, in the event the Unicode was not replaced with a functional code) to determine whether the corresponding entries are matched or mismatched. Comparing the entries of original query #1 at block 954 (Ub, Uo, Uo, Uk10) to the functional query entries at block 956 (Ub, Uo, Uo, Uk1), it is determined that there is a mismatch (i.e., Uk10 of the original query≠Uk 1 of the functional query).

Next at step 766, an expanded functional query is created by expanding the original query to include mismatched functional query entries. Specifically, for each entry of the original query in which a mismatch was identified at step 764, the original query is expanded, using an OR clause, to include the functional query entry. If the original query entry and the functional query entry match, the original query is not expanded. Because there is a mismatch between the entries of the original query and the entries of the functional query—(i.e., Uk10/Uk1), the original Query #1 is expanded resulting in the expanded functional query #1 "Ub, Uo, Uo, Uk10 OR Ub, Uo, Uo, Uk1" (see box 958).

At step 768, expanded functional query #1 ("Ubook10 OR Ubook1") is executed on the indexes of each record in the data set (i.e., Record A and Record B). Expanded functional query #1 is first applied to the indexes of Record A. Applying expanded functional query #1 (Ubook10 OR Ubook1) to Record A's original index including entry Ubook1 (see box 836) there is a query hit on Ubook1. Record A, therefore, is included in the original result set (see block 960). It is noted that Record A does not include a functional index to which expanded functional query #1 need be applied (see FIG. 8B, box 838).

Expanded functional query #1 is next applied to the indexes of Record B. Applying expanded functional query #1 (Ubook10 OR Ubook1) to Record B's original index including entry Ubook4 (see box 846) does not result in a query hit. Applying expanded functional query #1 (Ubook10 OR Ubook1) to Record B's functional index (Ubook1) (see box 848), results in a query hit on Ubook1. The functional index result set, therefore, includes Record B (see block 962).

A complete set of search results is provided by combining original and functional index results to provide a complete search result set for query #1 (i.e., Record A, Record B as shown in block 964 of FIG. 8D). At step 772, the de-duplication step is performed to eliminate duplicate results occurring in the complete result set. In this case, the execution of query #1 on the original and functional indexes associated with Records A and B resulted in a single instance of Record A and a single instance of Record B (see box 964). In this case, no duplication exists in the complete search result set therefore, deduplication does not alter the result set and the final result set resulting from de-duplication is the same as the complete result set (see block 966 of FIG. 8D).

Using the same database described in the example above, Query #2 is provided as another query example. Query #2 is looking for the term book with variation 4 of the character k (i.e., k4) represented by book4 (see block 972 of FIG. 8D).

At step 761, the original query is identified (book4) and includes original query entries Ub, Uo, Uo, Uk4 (see box 974). At step 762, the universal script is applied to the original query to create functional query entries providing a functional query. For each confusable character in the original query, each Unicode of the original query entry is replaced with the assigned functional code to provide a paired functional query entry. For excluded characters and other original query entries with special handling instructions, the original query entry will not be altered, i.e., the functional query entry will match the corresponding original query entry. As illustrated in box 976, application of the universal script to the original query provides a paired functional query in which Unicode character Uk4 is replaced with functional code Uk1 (see box 976).

Next, at step 764, each original query entry (i.e., the Unicode of the original query) is compared to the corresponding functional query entry resulting from application of the universal script (e.g., the functional code or the original Unicode, in the event the Unicode was not replaced with a functional code) to determine whether the corresponding entries are matched or mismatched. Comparing the entries of original query #2 at block 974 (Ub, Uo, Uo, Uk4) to the functional query entries at block 976 (Ub, Uo, Uo, Uk1), it is determined that there is a mismatch (i.e., Uk4 of the original query/Uk1 of the functional query).

Next, at step 766, an expanded functional query is created by expanding the original query to include mismatched functional query entries. Specifically, for each entry of the original query in which a mismatch was identified at step 764, the original query is expanded, using an OR clause to include the functional query entry. If the original query entry and the functional query entry match, the original query is not expanded. As illustrated on block 978, in this example, because there is a mismatch between the original query entries and functional query entries (i.e., Uk4 #Uk1), the original Query #2 is expanded resulting in the expanded functional query #2 "Ub, Uo, Uo, Uk4 OR Ub, Uo, Uo, Uk1" (see box 978).

At step 768, expanded functional query #2 ("Ubook4 OR Ubook1") is executed on the indexes of each record in the data set (i.e., Record A and Record B). First, expanded functional query #2 is applied to the indexes of Record A. Applying expanded functional query #2 (Ubook4 OR Ubook1) to Record A's original index including entry Ubook1 (see box 836) results in a query hit on Ubook1; therefore, Record A is included in the original result set (see block 980). It is noted that Record A does not include a functional index to which expanded functional query #2 need be applied (see FIG. 8B, box 838).

Next, expanded functional query #2 is applied to the indexes of Record B. Applying expanded functional query #2 (Ubook4 OR Ubook1) to Record B's original index including entry Ubook4 (see box 846), results in a query hit; therefore, Record B is included in the original result set (see box 982). Applying expanded functional query #2 (Ubook4 OR Ubook1) to Record B's functional index (Ubook1) (see box 848), results in a query hit on Ubook1, and the result set includes Record B (see block 984). A complete set of search results is provided by combining original and functional index results to provide a complete search result set. In this case, the execution of query #2 on the original indexes provided Record A and Record B, and the execution of the query on the functional indexes provided Record B. Thus, the complete result set includes: Record A, Record B, Record B (see box 984). At step 772, the de-duplication step is performed to eliminate duplicate results occurring in the complete result set. Record B is duplicated in the complete search result set; therefore, deduplication eliminates an instance of Record B resulting in a final/de-duplicated result set: Record A, Record B (see block 986 of FIG. 8D).

The simplified examples of FIGS. 8A-8D illustrate differences between prior art methods and the present invention. For example, prior art search methods that rely on LID will alter character Unicodes to predetermined Unicodes based on the language identified for each record, usually as a step in parsing the data for each record. In the example of FIGS. 8A-8D, if Record A was identified as Fictional Language 2, and the code in Fictional Language 2 corresponding to book1 was Ubook2, then the original content output, and, thus, the index for Record A would be changed to Ubook2. Additionally, the prior art will generally enable a query language to be selected by the user. Selecting a language will alter character Unicodes in the query to predetermined Unicodes based on the language identified by the user. In the example of FIGS. 8A-8D, if a user ran Query #1 and selected Fictional Language 2 as the query language, prior art would change book10 to Ubook2. In this way, the query matches the index. However, if the LID or the user's language selection mismatch, then no results for that record will be returned. For example, if the user in the above example selected Fictional Language 10 for Query #1, which retained book10 as Ubook10, neither Record A (Ubook1) nor Record B (Ubook4) would be returned.

In alternative prior art methods, the query would be expanded to include the confusable characters of the group. Query #1 searching for the term book10 would be expanded to "OR" all confusable characters in the group. For example, Query #1 ("book10") in this prior art method would be expanded to "book1 OR book2 OR book3 OR book4 OR book5 OR book6 OR book7 OR book8 OR book9 OR book10". Likewise, Query #2 ("book4") would be expanded to "book1 OR book2 OR book3 OR book4 OR book5 OR book6 OR book7 OR book8 OR book9 OR book10". Thus, expansion of the query term requires additional time and computational resources to search because each term in the expanded query is equivalent to running an additional query. Expansion of multiple query terms or phrases, e.g., "read a book" ("read1 a1 book1" OR "read2 a1 book1" OR "read1 a1 book2" OR etc.), results in exponential increases in time and computational resources to search.

FIGS. 9A-9C illustrate results obtained utilizing the prior art methods of linguistics software (e.g., ROSETTE BASE LINGUISTICS ("RBL")) and a query expansion tool and compares those results to the results obtained using the method of the present invention.

For the results illustrated in FIG. 9A, the same query for "علي" was conducted on the same database three times using two prior art methods (RBL and query expansion) and the invention. The English translation of the query term is the name "Ali". The database to be searched contained eight pieces of data containing the name Ali representing the desired search results. The results for each instance of the query is illustrated in FIG. 9A.

The rule set for RBL did not produce any Unicode variants for the query (0639 0644 0649) and the query returned only two results. Analysis of the results revealed that neither record contained Ali. Instead, both records identified by the search contained the term "عليكم", which is part of a common greeting "salaam alaikum". Further analysis revealed that the failure to return the eight instances of the name Ali resulted from the application of stemming rules applied by RBL. Neither of the results returned using the RBL method related to the eight desired records. The RBL method failed to identify all eight records containing the name Ali, which were sought by the query.

Turning to the query expansion method, the query was expanded to include the original variant (0639 0644 0649) along with two additional variants (0639 0644 06cc and 0639 0644 064A). Unicodes 06CC and 064A were recognized as Persian confusables of 0649 "Yeh" as a result of research of the Unicode standard and through Python community forums. This expanded query returned only five of the eight results desired, leaving three of the eight desired results missing. Analysis of the results revealed that the three missing results were likely due to normalization rules found within the original index. Specifically, an underscore "_" was attached to the final character.

For comparison, the method of the present invention was also used to search the database for the name "Ali". To begin, a de-confliction script was created in accordance with the method 300 illustrated in FIG. 3 from which a universal script was created in accordance with the method 700 illustrated in FIG. 7A. Next, the database to be queried, and containing the eight records, was identified, and the records were parsed in accordance with the method 720 illustrated in FIG. 7B.

Next, the universal script was applied to the original content output to create a functional output entry for every original content output entry. Specifically, application of the universal script to the original content output results in the replacement or substitution of the Unicode for each confusable character entry with its identified functional code. The collection of Unicodes and functional codes resulting from the application of the universal script provides the paired functional output.

After creation of the paired functional output, the entries of the paired functional output were compared to the corresponding entries of the original content output to identify matched and mismatched outputs.

Next, the original and functional indexes were created for each record of the database. Each original index of the record included the original content output entries. Each functional index of the record included the functional outputs for mismatched outputs identified at the comparison step. It is noted that no changes were made to how the original content output was indexed, and the present invention employed the same method and rules as the above prior art examples. In this example, additional analytics, e.g., -TF-IDF, were not applied to the databases.

Next, the query was identified, e.g., علي (English translation "Ali"). The original content output of the original query علي includes original query entries 0639 0644 0649 (i.e., the Unicodes representing original query علي). Next, the same universal script applied to the original database was applied to the original query output resulting in the paired functional output including functional query entries: 0639 0644 064A.

Next, the original query entries were compared to the corresponding functional query entries to identify matched or mismatched output. Comparing first original query entry to first functional query entry (0639 vs. 0639), the entries were determined to be a match. Comparing second original query entry to second functional query entry (0644 vs. 0644), the entries were determined to be a match. Comparing third original query entry to third functional query entry (0649 vs. 064A), however, the entries were determined to be mismatched. Due to the mismatch of the third entries, the original content output and the paired functional output were determined to be mismatched. An expanded functional query was created therefore to include the mismatched output. Specifically, the expanded functional query was "0639 0644 0649 OR 0639 0644 064A".

Alternatively, the expanded functional query "0639 0644 0649 OR 0639 0644 064A" was then run on the original index of each record in the database to provide a first result set (i.e., an original result set). In this example, none of the eight desired results were identified as a hit using the original indexes. Upon examination, it is observe red that three of the intended results were not identified as hit in the original indexes because the original index included an underscore "_" attached to the final character "yeh" (i.e., "علي_"). Although typical normalization rules applied to a database could have been used to remove these underscores, the party controlling the database customized the normalization rules to avoid the removal of the underscore because the presence of the underscore was necessary in another type of non-language query to be conducted against the database. The remaining five intended results had a Unicode value in the original indexes other than 0639 0644 0649.

When the expanded functional query was run on the functional indexes however, the functional index for each of the eight desired records (i.e., records containing the name Ali) matched the expanded functional query. Although the desired records were not identified using the original indexes, the invention correctly identified the desired records using the functional indexes. The invention provided a more robust outcome against the single database despite the customized normalization rules applied to the database.

Because of existing system architecture, the query was run as an expanded functional query ("0639 0644 0649 OR 0639 0644 064A") on the original and functional indexes. Alternatively, the functional query 0639 0644 064A (i.e., the functional query without expansion) could have been run on the original and functional indexes. It is anticipated running the functional query without expansion would provide the same results as those obtained using the expanded functional query.

Similar to FIGS. 9A and 9B illustrates search results relating to a query for the term شیمیایی (English translation, chemical). The "chemical query" was conducted three times. First the query was conducted using RBL, second the query was conducted using query expansion, and finally the query was conducted using the present invention. The database to be searched contained 205 records containing the word "chemical". Utilizing the RBL method, the query returned only 39 of the 205 desired results. Analysis of the results revealed that the language associated with the records was Farsi, and RBL correctly identified the language associated with the records as Farsi. Portions of the records, however, had unwittingly been transferred through unknown software prior to its integration into the database and prior to processing by RBL. The unknown software converted the native Farsi character string "06CC 06CC" to the Arabic string "064A 064A". This type of conversion is a common practice by software developers. Because RBL did not account for this specific character string when identifying variants of the string, RBL failed to convert all of the data back to "06CC 06CC".

As illustrated in FIG. 9B, utilizing the query expansion method, 197 of the 205 desired results were identified, leaving eight "missing" results. Due to the use of confusable characters, there are 36 possible variants of the query term شیمیایی. Analysis of the returned results revealed that although eight variants were included in the expanded query, all possible variants of the confusables were not included. Because query expansion hampers performance, particularly against large databases, in an effort to optimize performance, prior art limited query expansion to include variants that have been tested to have the highest rates of return. In this example, the expansion included eight common variants intended to provide at least 90% of the results. Although a large number of the desired results were correctly identified, as noted above, eight of the results were missing.

Finally, the "chemical query" was conducted using the present invention. A universal script and application of the universal script to the records to create original indexes and functional indexes was already described in connection with FIG. 9A. Next, the original content output of the "chemical query" was identified as including original query entries 0634 06CC 0645 06CC 0627 06CC 06CC. Next, the universal script was applied to the original content output to create a paired functional output. As illustrated in FIG. 6A, confusable character 06CC is assigned to functional code 064A. The paired functional output resulting from application of the universal script provides functional query entries. 0634 064A 0645 064A 0627 064A 064A. Next, the original query entries were compared to functional query entries to identify matched and mismatched entries. Comparing the first, third, and fifth original query entries to the first, third and fifth functional query entries (e.g., (0634 vs. 0634), (0645 vs. 0645), and (0627 vs. 0627), respectively), the entries were determined to be matched. Comparing second original query entry to second functional query entry (06CC vs. 064A) however, the codes were determined to be mismatched. Likewise, the fourth, sixth, and seventh entries were determined to be mismatched. An expanded functional query was created therefore to include the mismatched outputs. Specifically, the created expanded functional query was "0634 06CC 0645 06CC 0627 06CC 06CC OR 0634 064A 0645 064A 0627 064A 064A".

The expanded functional query was executed on the original indexes of the database records to obtain a first result set and on the functional indexes to obtain a second result set. The result sets were combined and de-duplicated to create a final result set which includes all 205 desired records.

Because of existing system architecture, the query was run as an expanded functional query "0634 06CC 0645 06CC 0627 06CC 06CC OR 0634 064A 0645 064A 0627 064A 064A" on the original and functional indexes. Alternatively, the functional query 0634 064A 0645 064A 0627 064A 064A (i.e., the functional query without expansion) could have been run on the original and functional indexes. It is anticipated running the functional query without expansion would provide the same results as those obtained using the expanded functional query.

FIG. 9C illustrates search results relating to a third query example seeking records containing the term کرونا (English translation, "corona"). The database to be searched contained fifty-three records containing the word کرونا all of which were desired to be identified in a search. Several different languages were associated with the fifty-three documents including Arabic (4), Pashto (7), and Farsi (27). The language of fifteen of the 53 records could not be identified by Language ID software.

Using the RBL method, indexing for the records occurred using language specific rules based on the language identified for each record (Arabic, Pashto, or Farsi). Specifically, an original index using Arabic rules was created for records identified by RBL as Arabic, an original index using Pashto rules was created for records identified by RBL as Pashto, and an original index using Farsi rules was created for records identified by RBL as Farsi. Records for which RBL could not identify a language were indexed using its default rules. Utilizing a dropdown menu to select the appropriate language for each query, the query was normalized using language-specific rules and each query was run against the database. The Arabic language query returned all four Arabic records containing the word corona; the Pashto language query returned 5 of the 7 Pashto records containing the word corona; and the Farsi language query returned 20 of the 27 Farsi records containing the term corona. None of the queries returned records for which the language could not be identified even though those records included the term corona. The exclusion of the additional documents was likely due to the fact that the normalization rules used for unknown languages are insufficient to account for idiosyncrasies in Arabic-script languages.

FIG. 9C also illustrates application of the prior art query expansion method to example 3. Utilizing a query expansion tool the query was expanded to include Arabic, Farsi, and Pashto variants of the term "corona". Specifically, the original Unicode variant of the corona query (06a9 0631 0648 0646 0627) was expanded to include the following Arabic, Farsi, and Pashto variants of the corona query:

0643 0631 0648 0646 0627
06A9 0631 0648 0646 0627
0643 0631 0648 0646 0622
0643 0631 0648 0646 0623
0643 0631 0648 0646 0625

The expanded query returned all 4 of the Arabic records containing the word corona; all 7 of the Pashto records containing the word corona; and all 27 of the Farsi records containing the term corona. In addition, using query expansion 11 of the 15 records for which the language could not be identified were included in the search results.

Finally, a query for the term کرونا ("corona") was conducted using the method of the present invention. The universal script prepared in connection with the example of FIG. 9A, were used for the query associated with FIG. 9C. In addition, the original indexes and the functional indexes created in connection with the example of FIG. 9A was used for example 3 in FIG. 9C. The original query entries associated with the original content output identified by the corona query are 06A9 0631 0648 0646 0627. The universal script was applied to the original content output (i.e., the corona query) to provide a paired functional output. As illustrated in FIG. 6B, confusable character 06A9 is assigned to functional code 0643. As a result, the functional query entries resulting from application of the universal script to the original content output are 0643 0631 0648 0646 0627. Next, the original query entries of the original content output were compared to the functional query entries of the paired functional output to identify mismatched entries. Comparing the first original query entry to the corresponding first functional query entry (0649 vs. 0643), the entries were determined to be mismatched. Comparing the remaining original query entries to the corresponding functional query entries (i.e., (0631 vs. 0631), (0648 vs. 0648), (0646 vs. 0646), and (0627 vs. 0627)), the entries were determined to be matched. An expanded functional query was created therefore to include the mismatched output. Specifically, the expanded functional query was "06A9 0631 0648 0646 0627 OR 0643 0631 0648 0646 0627".

Next, the expanded functional query was executed on the original and functional indexes associated with the database records. After combining and de-duplicating the original result set and functional result set to obtain a final result set, all 53 records were included in the final result set. Specifically, all four Arabic language records were included, all 7 Pashto language records were included; all 27 Farsi language records were included; and all 15 records whose language was not identified were included.

Because of existing system architecture, the query was run as an expanded functional query ("06A9 0631 0648 0646 0627 OR 0643 0631 0648 0646 0627") on the original and functional indexes. Alternatively, the functional query "0643 0631 0648 0646 0627" (i.e., the functional query without expansion) could have been run on the original and functional indexes. It is anticipated running the functional query without expansion would provide the same results as those obtained using the expanded functional query.

Figure 10:
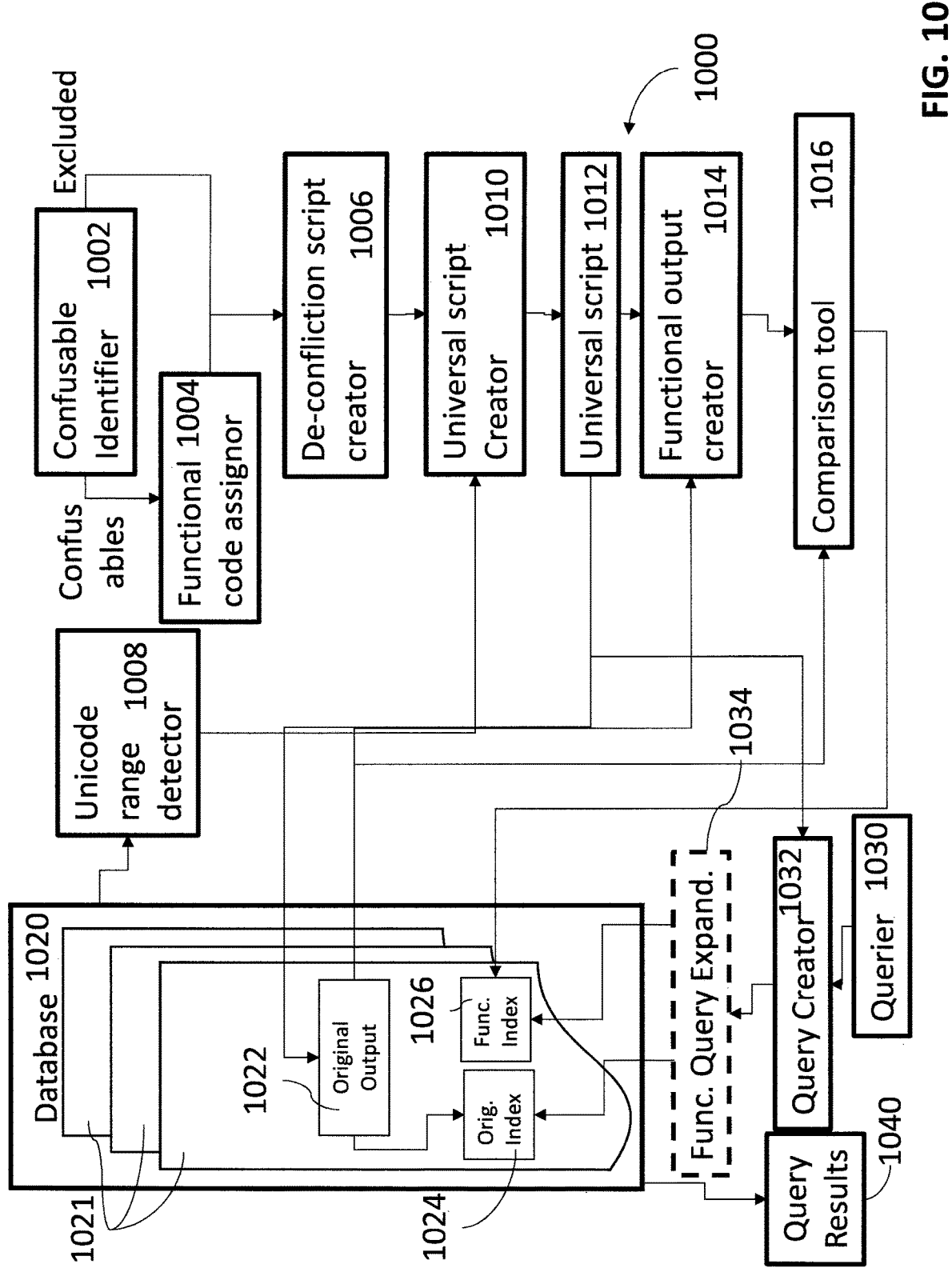
FIG. 10 illustrates a de-confliction system of the present invention.

FIG. 10 illustrates a de-confliction system 1000 of the present invention for interacting with a database 1020 and a querier 1030. The system 1000 includes a confusable identifier 1002 which identifies confusable Unicodes. The confusable identifier 1002 may utilize, for example, published lists of confusable characters, such as those provided by the Unicode Consortium, language expertise regarding interchangeable uses of characters, or information regarding substitutions of Unicodes resulting from software or language specific keyboards. The confusable identifier 1002 identifies each Unicode as a confusable or an excluded character. Characters identified as a confusable are provided to a functional code assignor 1004. The functional code assignor 1004 groups the confusables together to form functional groups and assigns a functional code to each functional group. The Unicodes associated with the identified excluded and confusable characters along with the functional codes assigned to the confusable characters are provided to a de-confliction script creator 1006. Each de-confliction script provided by the de-confliction script creator 1006 provides instructions for substituting Unicodes associated with confusable characters with functional codes.

A Unicode range detector 1008 receives information regarding the records 1021 of the database 1020. A variety of methods (e.g., statistical analysis discussed above) are available for determining the Unicode ranges associated with the database records 1021. A universal script creator 1010 receives an identification of Unicode ranges from the Unicode range detector 1008 and selects the relevant de-confliction scripts provided by the de-confliction script creator 1006 to create a universal script 1012.

Each record 1021 of database 1020 includes an original output 1022 resulting from parsing of the record, for example, and an original index 1024 associated with the original output 1022. As noted above, various methods are provided for the creation of the original index 1024. A functional output creator 1014 receives the universal script 1012 and the original content output 1022 and applies the universal script 1012 to the original content output 1022 to create a functional output. The functional output is provided to the comparison tool 1016. The comparison tool 1016 compares the original and functional outputs to identify mismatched outputs and provide entries of a functional index 1026.

Queries to be run on the records of the database 1020 are initiated at the querier 1030 and are provided to the query creator 1032. The query creator 1032 receives the initiated query along with the universal script 1012 and applies the universal script 1012 to the query to form a functional query. The functional query is provided to both the original and functional indexes 1024, 1026 to provide query results 1040. Running of the functional query on the original and functional indexes 1024, 1026 provides query results 1040.

As discussed above, a functional query expander 1034 may be provided to expand the functional query (e.g., using OR clauses) to include original query entries provided by the querier 1030 and functional query entries provided by the query creator 1032 to provide an expanded functional query. Running of the expanded functional query on the original and functional indexes 1024, 1026 provides query results 1040.

The invention provides several advantages over the prior art query methods. As demonstrated by the examples above, the invention returns precise and comprehensive results for databases storing multiple languages. In testing of the universal script including an Arabic script de-confliction script, all results for possible confusable character variants were returned without returning additional non-relevant results, whereas prior art consistently returned only a major portion of relevant results and often included non-relevant results. Thus, in addition to resolving confusable character variants, the invention's precision allows for it to be confidently used in conjunction with other query strategies, such as stemming and lemmatization, in order for an organization to further define their result set to encompass plurals, roots, like terms, and other variants that they deem pertinent.

The invention provides several advantages over prior art methods of querying a database. For example, prior art methods rely on a correct identification of the language of the database in order to implement language-specific normalization rules, which will improve the accuracy and completeness of search results. When databases include records associated with a variety of languages, the results of the prior art method are improved by creating multiple language-specific indices to which the language-specific normalization rules are applied. In contrast, each de-confliction script of the universal script of the present invention focuses on de-conflicting Unicode confusables/variants based on the Unicode value, independent of language or meaning. In this manner, de-confliction is achieved across multiple languages without the need to identify the language (s) of the database. Because language identification is not required, the performance of the invention is not degraded due to misidentification of language of all or part of a record and the resulting misprocessing due to the misidentification.

Because there is no need to identify the languages associated with the data, the invention provides the ability to address multiple languages in the database using a single additional index (i.e., the original index and a functional index) as opposed to altering the parsed original content output to create language-specific indexes for each record.

In addition to addressing multiple languages, the present invention accounts for common substitution practices which previously led to inaccurate search results. For example, the universal script may account for the use of the Arabic keyboard by non-Arabic speakers (e.g., a Farsi speaking native using an Arabic keyboard often types an Alef Maksura in place of an Arabic yeh because the Alef Maksura more closely resembles the Farsi yeh); the substitution of uncommon characters by easily-typed characters (e.g., a Farsi speaking native typically drops the Madda from Alef Madda when typing because it requires the typist to hold the shift button); and logical conversions made by software (e.g., software conversion of all Farsi characters to Arabic characters).

Application of the universal script to the database provides consistency within the data thereby improving retrievability, while also allowing for and improving additional analytics (e.g., Language ID, machine translation, etc.) and/or normalization schemes (e.g., stemming and lemmatization) to be utilized. Although the invention does not require language identification, the invention may be used in conjunction with RBL or other LID-dependent analytics to further improve query performance. For example, RBL may be used to address linguistic nuances in each language at the parsing stage. In doing so, RBL applies confusables to the original content output as the output is generated. Despite the presence of these confusables, application of the universal script in this scenario enables the ability to query the dataset with high precision and recall.

Another advantage of the invention is that queries run against the database may include entries from multiple languages, including languages not represented by the universal script selected. For example, in the event the universal script is limited to de-confliction scripts addressing confusable Arabic script characters, query entries including Chinese characters may be executed and the results obtained are not impacted by application of the universal script.

While embodiments of the present invention are shown and described, it is envisioned that those skilled in the art may devise various modifications of the present invention without departing from the spirit and scope of the appended claims.

The invention claimed is:

1. A method of improving search results associated with a database that includes confusable characters, the method comprising:
   for each record among a plurality of records in the database;
   parsing the record to extract text within the record and to generate an original content output including Unicodes associated with the text;
   creating an original index based on the original content output;
   creating a paired functional output based on the original content output by including each Unicode associated with an excluded character of the original content output as-is and by substituting each Unicode associated with a confusable character of the original content output with an assigned functional code, wherein the excluded character is any character other than the confusable character, and wherein the assigned functional code corresponds to a functional group of Unicodes that includes the Unicode associated with the confusable character and one or more other Unicodes associated with variations of the confusable character;
   in accordance with a determination that there is a mismatch between the original content output and the functional output, retaining the functional output and creating a functional index based on the functional output; and
   in accordance with a determination that there is a match between the original content output and the functional output, discarding the functional output and forgoing creation of the functional index based on the functional output.

2. The method of improving search results associated with the database in accordance with claim 1, further including the steps of:
  obtaining an original query including at least one Unicode to be applied to the database; and
  creating a functional query based on the original query by including each Unicode associated with an excluded character of the original query as-is and by substituting each Unicode associated with a confusable character of the original query with an assigned functional code, wherein the excluded character is any character other than the confusable character, and wherein the assigned functional code corresponds to a functional group of Unicodes that includes the Unicode associated with the confusable character and one or more other Unicodes associated with variations of the confusable character.

3. The method of improving search results associated with the database in accordance with claim 2, further including the steps of:
  for each record among the plurality of records in the database, running the functional query against the original index and the functional index to obtain a search result set including all records for which a match is identified between the functional query and the original or functional index.

4. The method of improving search results associated with the database in accordance with claim 3, further including the step of:
  de-depulicating the search result to eliminate duplicate instances of the same record in the results.

5. The method of improving search results associated with the database in accordance with claim 1, further including the steps of:
  obtaining an original query including at least one Unicode to be applied to the database;
  creating a functional query based on the original query by including each Unicode associated with an excluded character of the original query as-is and by substituting each Unicode associated with a confusable character of the original query with an assigned functional code, wherein the excluded character is any character other than the confusable character, and wherein the assigned functional code corresponds to a functional group of Unicodes that includes the Unicode associated with the confusable character and one or more other Unicodes associated with variations of the confusable character;
  comparing the original query to the functional query to identify mismatched entries;
  in accordance with a determination that there is a mismatch between the original query and the functional query, creating an expanded functional query by expanding the original query, using an OR clause, to include the functional query; and
  in accordance with a determination that there is a match between the original query and the functional query, discarding the functional query.

6. The method of improving search results associated with the database in accordance with claim 5, further including the steps of:
  for each record among the plurality of records in the database, running the expanded functional query against the original index and the functional index to obtain a search result set including all records for which a match is identified between the expanded functional query and the original index or between the expanded functional query and the functional index.

7. The method of improving search results associated with the database in accordance with claim 6, further including the step of:
  de-duplicating the search result in order to eliminate duplicate instances of the same record in the search results.

8. The method of improving search results associated with the database in accordance with claim 1, wherein a first set of the assigned functional codes are defined by a first de-confliction script, wherein the first de-confliction script addresses a pre-determined set of characters and their associated Unicodes and provides a set of rules for processing a record or a query to minimize the impact of confusable characters.

9. The method of improving search results associated with the database in accordance with claim 8, wherein a second set of the assigned functional codes are defined by a second de-confliction script different from the first de-confliction script, and the method further incudes the step of verifying compatibility of the first and second de-confliction scripts.

10. The method of improving search results associated with the database in accordance with claim 1, further including the steps of:
  storing the original index within a first unique field within the record; and
  in accordance with the determination that there is a mismatch between the original content output and the functional output, storing the functional index within a second unique field within the record.

11. A method of adapting a database of records including Unicodes associated with confusable characters and Unicodes associated with excluded characters to improve query results, the method comprising;
  parsing a plurality of records from the database to extract text within the plurality of records and to generate an original content outputs associated with the plurality of records including Unicodes associated with the text;
  identifying a first set of characters from the text to be addressed by a first de-confliction script, wherein the first set of characters corresponds to a first group of Unicodes within a related range of Unicodes;
  identifying a first subset of Unicodes among the first group of Unicodes associated with confusable characters and a second subset of Unicodes among the first group of Unicodes associated with excluded characters, wherein the excluded characters are character other than the confusable characters;
  grouping Unicodes within the first subset of Unicodes to form one or more first functional groups;
  assigning a functional code to each of the one or more first functional groups;
  creating a first de-confliction script, the first de-confliction script providing instructions to create a paired functional output for each of the plurality of records by including each Unicode associated with an excluded character of the first set of characters of the original content output as-is and to substitute each Unicode associated with a confusable character of the first set of characters of the original content output with an assigned functional code;
  creating a universal script based on said first de-confliction script; and
  applying said universal script to said original content outputs to create functional outputs.

12. The method of adapting a database of records in accordance with claim 11, further comprising the steps of:

comparing each original content output with its paired functional output to identify mismatched outputs; and for each mismatched output, creating a functional index.

13. The method of adapting a database of records in accordance with claim 12, further comprising the step of creating an original index based on said original content output.

14. The method of adapting a database of records in accordance with claim 11, further comprising the steps of:
identifying a second set of characters from the text to be addressed by a second de-confliction script, wherein the second set of characters corresponds to a second group of Unicodes within a related range of Unicodes;
identifying a first subset of Unicodes among the second group of Unicodes associated with confusable characters of and a second subset of Unicodes among the second group of Unicodes associated with excluded characters, wherein the excluded characters are character other than the confusable characters;
grouping Unicodes within the first subset of Unicodes to form one or more second functional groups;
assigning a functional code to each of the one or more second functional groups;
creating a second de-confliction script, the second de-confliction script providing instructions to create a paired functional output for each of the plurality of records by including each Unicode associated with an excluded character of the second set of characters of the original content output as-is and to substitute each Unicode associated with a confusable character of the second set of characters of the original content output with an assigned functional code; and
wherein said step of creating the universal script is further based on said second de-confliction script.

15. The method of adapting a database of records in accordance with claim 14, further comprising the steps of:
comparing each original content output with its paired functional output to identify mismatched outputs; and
for each mismatched output, creating a functional index.

16. The method of adapting a database of records in accordance with claim 15, further comprising the step of creating an original index based on said original content output.

17. A de-confliction system providing improved query results obtained from a database of records, comprising:
one or more processors;
non-transitory memory; and
one or more programs stored in the non-transitory memory, which, when executed by the one or more processors, are configured to provide:
a confusable identifier for identifying Unicodes associated with confusable characters and Unicodes associated with excluded characters, wherein the excluded characters are any character other than the confusable characters;
a functional code assignor for grouping said identified confusable characters that are associated with variations of a same confusable character and for assigning a functional code to each identified grouping of confusable characters;
a de-confliction script creator for providing at least one de-confliction script including instructions to substitute each Unicode associated with a confusable character with the assigned functional code;
a universal script creator for combining selected de-conflictions scripts to create a universal script;
a functional output creator for receiving the universal script and applying the universal script to an original output of each database record to create a functional output of each database record; and
a comparison tool for comparing the functional output with the original output of each database record and for creating a functional index in response to determining that the functional output does not match the original output and for forgoing creation of the functional index in response to determining that the functional output matches the original output.

18. The de-confliction system of claim 17, further including:
a Unicode range detector in communication with the Universal script creation, wherein the Unicode range detector identifies the Unicode ranges associated with the database and the selection of de-confliction scripts is based on the detected Unicode ranges.

19. The de-confliction system of claim 17, further including:
a query creator for receiving the universal script and an original query including original query entries and for applying the universal script to the query to provide a functional query including functional query entries.

20. The de-confliction system of claim 19, further including:
a query expander for expanding the functional query to include mismatched functional and original query entries.

* * * * *